United States Patent
Gooderum et al.

(10) Patent No.: US 6,219,707 B1
(45) Date of Patent: *Apr. 17, 2001

(54) SYSTEM AND METHOD FOR ACHIEVING NETWORK SEPARATION

(75) Inventors: Mark P. Gooderum, Blaine; Trinh Q. Vu, Minneapolis; Glenn Andreas, Fridley, all of MN (US)

(73) Assignee: Secure Computing Corporation, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/233,015

(22) Filed: Jan. 19, 1999

Related U.S. Application Data

(63) Continuation of application No. 08/599,232, filed on Feb. 9, 1996.

(51) Int. Cl.[7] .......................... G06F 15/173; G06F 15/16
(52) U.S. Cl. .......................... 709/225; 709/229; 709/235; 713/200
(58) Field of Search ........................... 709/235, 229, 709/228, 227, 226, 201, 249, 225; 713/200, 201, 202, 182, 168, 181; 370/401

(56) References Cited

U.S. PATENT DOCUMENTS

| | | | |
|---|---|---|---|
| 3,956,615 | 5/1976 | Anderson et al. | 235/61.7 B |
| 4,104,721 | 8/1978 | Markstein et al. | 364/200 |
| 4,177,510 | 12/1979 | Appell et al. | 364/200 |
| 4,442,484 | 4/1984 | Childs, Jr. et al. | 364/200 |

(List continued on next page.)

FOREIGN PATENT DOCUMENTS

| | | | |
|---|---|---|---|
| 0420779 | 4/1991 | (EP) | H04L/12/54 |
| 0 554 182 A1 | 4/1993 | (EP) | H04L/29/06 |
| 0653862 | 5/1995 | (EP) | H04L/12/02 |
| 0 743 777 A2 | 11/1996 | (EP) | H04L/29/06 |
| 2287619 | 9/1995 | (GB) | H04L/12/22 |
| 96/13113 | 5/1996 | (WO) | H04L/29/06 |
| 96/31035 | 10/1996 | (WO) | H04L/12/24 |
| 96/35994 | 11/1996 | (WO) | G06F/13/14 |
| 97/13340 | 4/1997 | (WO) | H04L/9/00 |
| 97/26731 | 7/1997 | (WO) | H04L/9/00 |
| 97/26734 | 7/1997 | (WO) | H04L/9/00 |
| 97/26735 | 7/1997 | (WO) | H04L/9/00 |
| 97/29413 | 8/1997 | (WO) . | |

OTHER PUBLICATIONS

International Search Report, PCT Application No. PCT/US 95/12681, 8 p., (mailed Apr. 9, 1996).

News Release: "100% of Hackers Failed to Breack Into One Internet Site Protected by Sidewinder(tm)", Secure Computing Corporation, (Feb. 16, 1995).

News Release: "Internet Security System Given 'Product of the Year' Award", Secure Computing Corporation, (Mar. 28, 1995).

(List continued on next page.)

*Primary Examiner*—Mark H. Rinehart
*Assistant Examiner*—Paul Kang
(74) *Attorney, Agent, or Firm*—Schwegman, Lundberg, Woessner & Kluth, P.A.

(57) ABSTRACT

A system and method of achieving network separation within a computing system having a plurality of network interfaces. A plurality of burbs or regions is defined, wherein the plurality of burbs includes a first and a second burb and wherein each burb includes a protocol stack. Each of the plurality of network interfaces is assigned to one of the plurality of burbs and more than one network interface can be assigned to a particular burb. Processes are bound to specific burbs when they try to access that burb's protocol stack and communication between processes assigned to different burbs is restricted so that a communication between a process bound to one burb must pass through a proxy before being sent to a different burb.

24 Claims, 10 Drawing Sheets

U.S. PATENT DOCUMENTS

| | | | |
|---|---|---|---|
| 4,584,639 | 4/1986 | Hardy | 364/200 |
| 4,621,321 | 11/1986 | Boebert et al. | 364/200 |
| 4,648,031 | 3/1987 | Jenner | 364/200 |
| 4,701,840 | 10/1987 | Boebert et al. | 364/200 |
| 4,713,753 | 12/1987 | Boebert et al. | 364/200 |
| 4,870,571 | 9/1989 | Frink | 364/200 |
| 4,885,789 | 12/1989 | Burger et al. | 380/25 |
| 4,914,568 | 4/1990 | Kodosky et al. | 364/200 |
| 5,077,658 | 12/1991 | Bendert et al. | 395/600 |
| 5,093,914 | 3/1992 | Coplien et al. | 395/700 |
| 5,124,984 | 6/1992 | Engel | 370/94.1 |
| 5,153,918 | 10/1992 | Tuai | 380/25 |
| 5,204,961 | 4/1993 | Barlow | 395/725 |
| 5,228,083 | 7/1993 | Lozowick et al. | 380/9 |
| 5,251,131 | 10/1993 | Masand et al. | 364/419.08 |
| 5,263,147 | 11/1993 | Francisco et al. | 395/425 |
| 5,272,754 | 12/1993 | Boebert | 380/25 |
| 5,276,735 | 1/1994 | Boebert et al. | 380/21 |
| 5,276,789 | 1/1994 | Besaw et al. | 395/140 |
| 5,303,303 | 4/1994 | White | 380/49 |
| 5,305,385 | 4/1994 | Schanning et al. | 380/49 |
| 5,311,593 | 5/1994 | Carmi | 380/23 |
| 5,329,623 | 7/1994 | Smith et al. | 395/275 |
| 5,333,266 | 7/1994 | Boaz et al. | 395/200 |
| 5,355,474 | 10/1994 | Thuraisngham et al. | 395/600 |
| 5,414,833 | 5/1995 | Hershey et al. | 395/575 |
| 5,455,828 | 10/1995 | Zisapel | 370/85.3 |
| 5,485,460 | 1/1996 | Schrier et al. | 370/94.1 |
| 5,511,122 | 4/1996 | Atkinson | 380/25 |
| 5,530,758 | 6/1996 | Marino, Jr. et al. | 380/49 |
| 5,548,507 | 8/1996 | Martino et al. | 364/419.01 |
| 5,548,646 | 8/1996 | Aziz et al. | 380/23 |
| 5,550,984 | 8/1996 | Gelb | 395/200.17 |
| 5,555,346 | 9/1996 | Gross et al. | 395/51 |
| 5,566,170 | 10/1996 | Bakke et al. | 370/60 |
| 5,583,940 | 12/1996 | Vidrascu et al. | 380/49 |
| 5,586,260 | 12/1996 | Hu | 395/200.2 |
| 5,604,490 | 2/1997 | Blakley, III et al. | 340/825.31 |
| 5,606,668 | 2/1997 | Shwed | 395/200.11 |
| 5,615,340 | 3/1997 | Dai et al. | 395/200.17 |
| 5,619,648 | 4/1997 | Canale et al. | 395/200.01 |
| 5,623,601 | 4/1997 | Vu | 395/187.01 |
| 5,632,011 | 5/1997 | Landfield et al. | 395/326 |
| 5,636,371 | 6/1997 | Yu | 395/500 |
| 5,644,571 | 7/1997 | Seaman | 370/401 |
| 5,671,279 | 9/1997 | Elgamal | 380/23 |
| 5,673,322 | 9/1997 | Pepe et al. | 380/49 |
| 5,684,951 | 11/1997 | Goldman et al. | 395/188.01 |
| 5,689,566 | 11/1997 | Nguyen | 380/25 |
| 5,699,513 | 12/1997 | Feigen et al. | 395/187.01 |
| 5,706,507 | 1/1998 | Schloss | 395/615 |
| 5,720,035 | 2/1998 | Allegre et al. | 395/200.06 |
| 5,781,550 | 7/1998 | Templin et al. | 370/401 |
| 5,828,833 | 10/1998 | Belville et al. | 395/187.01 |
| 5,828,893 | 10/1998 | Wied et al. | 395/800 |
| 5,864,683 | 1/1999 | Boebert et al. | 395/200.79 |
| 5,896,499 | 4/1999 | McKelvey | 395/187.01 |
| 5,898,830 | 4/1999 | Wesinger, Jr. et al. | 395/187.01 |
| 5,918,018 * | 6/1999 | Gooderum et al. | 709/235 |
| 5,950,195 | 9/1999 | Stockwell et al. | 707/4 |
| 5,958,016 | 9/1999 | Chang et al. | 709/229 |
| 5,968,176 | 10/1999 | Nessett et al. | 713/201 |

OTHER PUBLICATIONS

News Release: "SATAN No Threat to Sidewinder(tm)", Secure Computing Corporation, (Apr. 26, 1995).

"Answers to Frequently Asked Questions About Network Security", *Secure Computing Corporation*, p. 1–41 & p. 1–16, (Sep. 25, 1994).

"Sidewinder Internals", Product information, Secure Computing Corporation, 16 p., (Oct. 1994).

"Special Report; Secure Computing Corporation and Network Security", *Computer Select*, 13 p., (Dec. 1995).

Adam, J.A., "Meta–Matrices", *IEEE Spectrum*, pp. 26–27, (Oct. 1992).

Adam, J.A., "Playing on the Net", *IEEE Spectrum*, p. 29, (Oct. 1992).

Ancilotti, P., et al., "Language Features for Access Control", *IEEE Transactions on Software Engineering*, SE–9, 16–25, (Jan. 1983).

Badger, L., et al., "Practical Domain and Type Enforcement for UNIX", Proceedings of the 1995 IEEE Symposium on Security and Privacy, pp. 66–67, (May 1995).

Belkin, N.J., et al., "Information Filtering and Information Retrieval: Two Sides of the Same Coin?", *Communications of the ACM*, 35, 29–38, (Dec. 1992).

Bellovin, S.M., et al., "Network Firewalls", *IEEE Communications Magazine*, 32, 50–57, (Sep. 1994).

Bevier, W.R., et al., "Connection Policies and Controlled Interference", Proceedings of the Eighth IEEE Computer Security Foundations Workshop, Kenmare, Ireland, pp. 167–176, (Jun. 13–15, 1995).

Bowen, T.F., et al., "The Datacycle Architecture", *Communications of the ACM*, 35, 71–81, (Dec. 1992).

Bryan, J., "Firewalls For Sale", *BYTE*, 99–100, 102, 104–105, (Apr. 1995).

Cobb, S., "Establishing Firewall Policy", *IEEE*, 198–205, (1996).

Damashek, M., "Gauging Similarity with n–Grams: Language–Independent Categorization of Text", *Science*, 267, 843–848, (Feb. 10, 1995).

Dillaway, B.B., et al., "A Practical Design For A Multilevel Secure Database Management System", *American Institute of Aeronautics and Astronautics, Inc.*, pp. 44–57, (Dec. 1986).

Fine, T., et al., "Assuring Distributed Trusted Mach", Proceedings of the IEEE Computer Society Symposium on Research in Security and Privacy, pp. 206–218, (1993).

Foltz, P.W., et al., "Personalized Information Delivery: An Analysis of Information Filtering Methods", *Communications of the ACM*, 35, 51–60, (Dec. 1992).

Gassman, B., "Internet Security, and Firewalls Protection on the Internet", *IEEE*, 93–107, (1996).

Goldberg, D., et al., "Using Collaborative Filtering to Weave an Information Tapestry", *Communications of the ACM*, 35, 61–70, (Dec. 1992).

Grampp, F.T., "UNIX Operating System Security", *AT&T Bell Laboratories Technical Journal*, 63, 1649–1672, (Oct. 1984).

Greenwald, M., et al., "Designing an Academic Firewall: Policy, Practice, and Experience with SURF", *IEEE*, 79–92, (1996).

Haigh, J.T., et al., "Extending the Noninterference Version of MLS for SAT", Proceedings of the 1986 IEEE Symposium on Security and Privacy, Oakland, CA, pp. 232–239, (Apr. 7–9, 1986).

Karn, P., et al., "The ESP DES–CBC Transform", Network Working Group, Request for Comment No. 1829, http//ds.internic.net/rfc/rfc1829.txt, 9 p., (Aug. 1995).

Kent, S.T., "Internet Privacy Enhanced Mail", *Communications of the ACM*, 36, 48–60, (Aug. 1993).

Lampson, B.W., et al., "Dynamic Protection Structures", AFIPS Conference Proceedings, 35, 1969 Fall Joint Computer Conference, Las Vegas, NV, 27–38, (Nov. 18–20, 1969).

Lee, K.C., et al., "A Framework for Controlling Cooperative Agents", *Computer*, 8–16, (Jul. 1993).

Lodin, S.W., et al., "Firewalls Fend Off Invasions from the Net", *IEEE Spectrum*, 26–34, (Feb. 1998).

Loeb, S., "Architecting Personalized Delivery of Multimedia Information", *Communications of the ACM*, 35, 39–48, (1992).

Loeb, S., et al., "Information Filtering", *Communications of the ACM*, 35, 26–28, (Dec. 1992).

McCarthy, S.P., "Hey Hackers! Secure Computing Says You Can't Break into This Telnet Site", *Computer Select*, 2 p., (Dec. 1995).

Merenbloom, P., "Network 'Fire Walls' Safeguard LAN Data from Outside Intrusion", *Infoworld*, p. 69 & addnl page, (Jul. 25, 1994).

Metzger, P., et al., "IP Authentication using Keyed MD5", Network Working Group, Request for Comments No. 1828, http//ds.internic.net/rfc/rfc1828.txt, 5 p., (Aug. 1995).

Mills, D.L., "Network Time Protocol (Version 3) Specification, Implementation and Analysis", *University of Delaware Network Working Group*, 1–48, (Mar. 1992).

Obraczka, K., et al., "Internet Resource Discovery Services", *Computer*, 8–22, (Sep. 1993).

Peterson, L.L., et al., In: *Computer Networks*, Morgan Kaufmann Publishers, Inc., San Francisco, CA, pp. 218–221, 284–286, (1996).

Press, L., "The Net: Progress and Opportunity", *Communications of the ACM*, 35, 21–25, (Dec. 1992).

Schroeder, M.D., et al., "A Hardware Architecture for Implementing Protection Rings", *Communications of the ACM*, 15, 157–170, (Mar. 1972).

Schwartz, M.F., "Internet Resource Discovery at the University of Colorado", *Computer*, 25–35, (Sep. 1993).

Smith, R.E., "Constructing a High Assurance Mail Guard", Secure Computing Corporation (Appeared in the Proceedings of the National Computer Security Conference), 7 p., (1994).

Smith, R.E., "Sidewinder: Defense in Depth Using Type Enforcement", *International Journal of Network Management*, pp. 219–229, (Jul.–Aug. 1995).

Stadnyk, I., et al., "Modeling User's Interests in Information Filters", *Communications of the ACM*, 35, 49–50, (Dec. 1992).

Stempel, S., "IpAccess—An Internet Service Access System for Firewall Installations", *IEEE*, 31–41, (1995).

Stevens, C., "Automating the Creation of Information Filters", *Communications of the ACM*, 35, 48, (Dec. 1992).

Thomsen, D., "Type Enforcement: The New Security Model", *SPIE*, 2617, 143–150, (1995).

Warrier, U.S., et al., "A Platform for Heterogeneous Interconnection Network Management", *IEEE Journal on Selected Areas in Communications*, 8, 119–126, (Jan. 1990).

White, L.J., et al., "A Firewall Concept for Both Control–Flow and Data–Flow in Regression Integration Testing", *IEEE*, 262–271, (1992).

Wolfe, A., "Honeywell Builds Hardware for Computer Security", *Electronics*, 14–15, (Sep. 2, 1985).

Boebert, W.E., et al., "Secure Ada Target: Issues, System Design, and Verification", Proceedings of the Symposium on Security and Privacy, Oakland, California, pp. 59–66, (Apr. 1985).

Boebert, W.E., et al., "Secure Computing: The Secure Ada Target Approach", *Sci. Honeyweller*, 6(2), 17 pages, (1985).

\* cited by examiner

SYSTEM AND METHOD FOR ACHIEVING NETWORK SEPARATION

This application is a continuation of, and claims priority from, U.S. patent application Ser. No. 08/599,232, filed Feb. 9, 1996.

BACKGROUND OF THE INVENTION

1. Field of the Invention

The present invention relates to computer security, and more particularly, to an apparatus and method for providing increased computer security by assigning processes to regions and restricting communication between regions.

2. Background Information

There has been an explosion in the growth of computer networks as organizations realize the benefits of networking their personal computers and workstations. Increasingly, these networks are falling prey to malicious outsiders who hack into the network, reading and sometimes destroying sensitive information. Exposure to such attacks has increased as companies connect to outside systems such as the Internet.

To protect themselves from attacks by malicious outsiders, organizations are turning to mechanisms for increasing network security. One such mechanism is described in "SYSTEM AND METHOD FOR PROVIDING SECURE INTERNETWORK SERVICES", U.S. patent application Ser. No. 08/322,078 filed Oct. 12, 1994 by Boebert et al., the discussion of which is hereby incorporated by reference. Boebert teaches that modifications can be made to the kernel of the operating system in order to add type enforcement protections to the operating system kernel. This protection mechanism can be added to any other program by modifications to the program code made prior to compiling. It cannot, however, be used to add type enforcement protection to program code after that program code has been compiled.

Type enforcement is a file level mechanism for which provides con What is needed is a way of adding computer security protection to compiled program code to increase secure operation of such code.

SUMMARY OF THE INVENTION

The present invention is a system and method of achieving network separation within a computing system having a plurality of network interfaces. A plurality of burbs or regions is defined, wherein the plurality of burbs includes a first and a second burb and wherein each burb includes a protocol stack. Each of the plurality of network interfaces is assigned to one of the plurality of burbs and more than one network interface can be assigned to a particular burb. Processes are bound to specific burbs when they try to access that burb's protocol stack and communication between processes assigned to different burbs is restricted.

According to another aspect of the present invention, a secure server is described which includes an operating system kernel, a plurality of network interfaces which communicate with the operating system kernel and a plurality of burbs, including a first and a second burb. Each network interface is assigned to one burb from the plurality of burbs and each burb includes its own protocol stack for handling communication across the network interfaces assigned to that burb. Each protocol stack is associated with only one burb. Finally, communication between a process bound to one burb must pass through a proxy before being sent to a different burb.

DETAILED DESCRIPTION OF THE PREFERRED EMBODIMENTS

Figure 1:
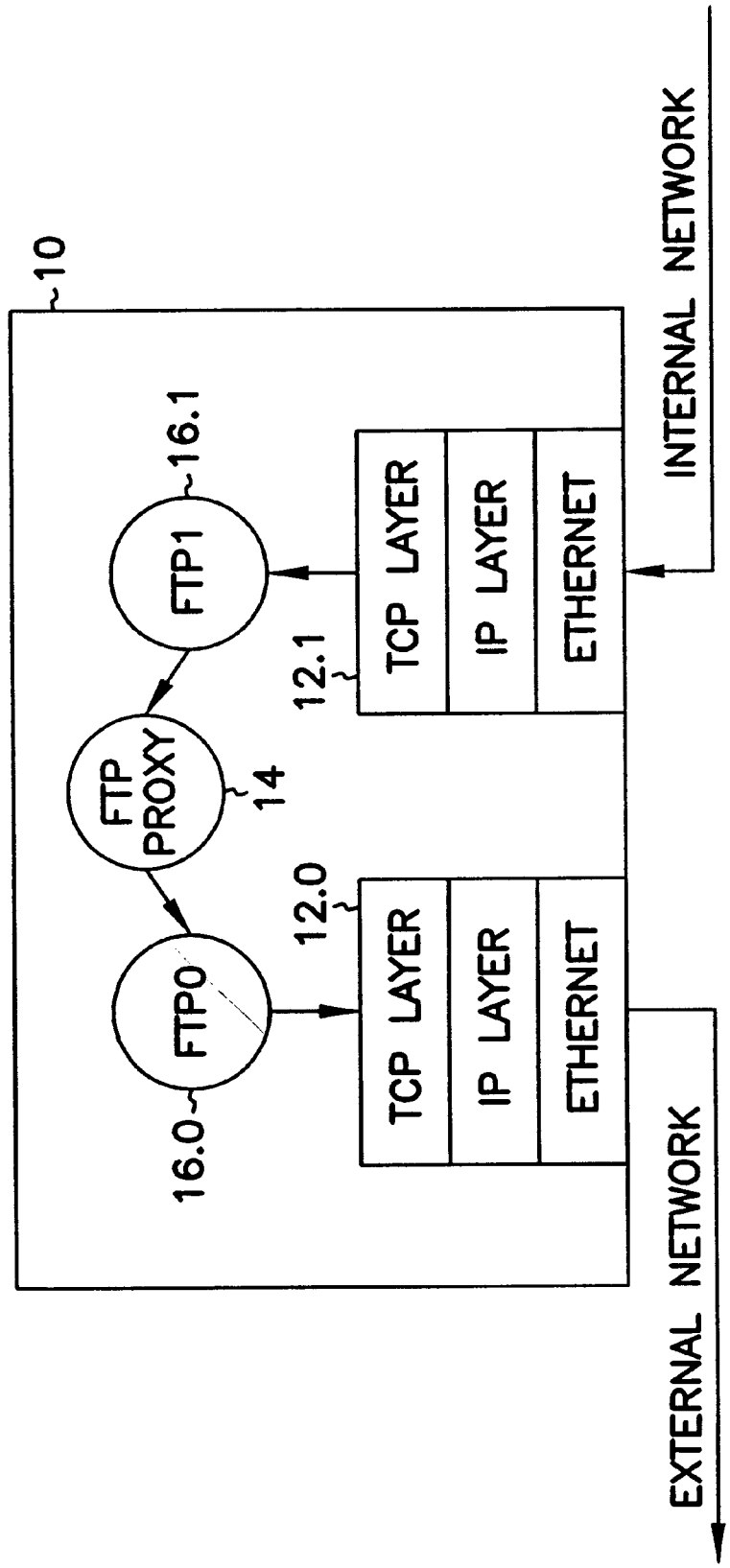
FIG. 1 is a representation of a system having an internal and external interface connected via two separate protocol stacks.

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Computer systems which use a single communications protocol stack to handle communication between an internal and an external network are widely in use. This is the communication model used, for instance, in BSD 4.4. The problem with such a system is that once a process receives privileges within the system, it can use those privileges to access other network files. This can lead to a dangerous breach of network security. Two approaches can be used to beef up the security of such a system: type enforcement and network separation. Type enforcement adds an additional level of protection to the process of accessing files. Network separation divides a system into a set of independent regions. Through network separation a malicious attacker who gains control of one of the regions is prevented from being able to compromise processes executing in other regions. Type enforcement and network separation will be described next.

Type Enforcement

In "SYSTEM AND METHOD FOR PROVIDING SECURE INTERNETWORK SERVICES", U.S. patent application Ser. No. 08/322,078 filed Oct. 12, 1994, Boebert et al. describe a way of extending type enforcement protection to a computer system having both an internal private network and an external public network. In one embodiment of such a system, a secure computer is used to connect a private network having a plurality of workstations to a public network. A protocol package (such as TCP/IP) running on the secure computer implements a communications protocol used to communicate between each workstation and the secure computer. A Local Cryptography function can be integrated into the protocol package in order to protect and authenticate traffic on the private network.

Program code running on the secure computer is used to communicate through the private network to the workstation's protocol package. In one embodiment, the secure computer is an Intel Pentium-based machine running a hardened form of BSD386 Unix. A system based on a 90 MHz Pentium microprocessor with 32 megabytes of memory, 2 gigabytes of hard disk space, a DAT tape for backup and a CD-ROM for software loads has been found to be adequate.

Likewise, program code running on the secure computer is used to communicate through a public network interface to a public network such as the Internet. In an Internet embodiment, the program code used to communicate with the Internet is part of a set of Internet protocols which communicate with computers on the Internet through an Internet connection. In one embodiment, different protocols and cryptographic methods may be used when communicating with different entities on the Internet. In one embodiment, a tcp wrapper package operating in the Internet protocols is used to sit on the external, public network so that information about external probes can be logged. It is most likely that the open nature of the public network will favor the use of public-key cryptography in this module.

As noted above, in one embodiment the secure computer is an Intel Pentium-based machine running a hardened form of Berkeley's BSD386 Unix. In that embodiment, BSD386 is hardened by adding a type enforcement mechanism which restricts the access of processes to data. Type enforcement operates in conjunction with page access control bits in the virtual page translator of the Pentium to control access to objects stored in the memory of the secure computer. To accomplish this, system calls in the basic BSD386 kernel were modified so that type enforcement checks cannot be avoided. Certain other system calls were either disabled or had certain options disabled.

The type enforcement controls are enforced by the kernel and cannot be circumvented by applications. Type enforcement is used to implement data flow structures called Assured Pipelines. Assured pipelines are made possible by the so-called "small process" model of computation used by Unix. In this model, a computational task is divided up into small virtual units that run in parallel to each other. Unix provides a crude and loosely-controlled way of sharing data between processes. Type enforcement supplants this with the rigorously controlled, configurable structure of assured pipelines. It should be noted that Type Enforcement works best as a supplement to the normal Unix permissions. That is, the Unix permissions are the first line of defense; when processes get past the Unix permissions, however, they run into the type enforcement checks.

In one embodiment, the secure computer has been configured under BSD386 to run in one of two states: administrative and operational. In the administrative state all network connections are disabled and the Server will only accept commands from a properly authenticated System Administrator accessing the system from the hard-wired administrative terminal. This feature prevents anyone other than the System Administrator from altering the security databases in the secure computer.

In the operational state the network connections are enabled and the Server will execute only software which has been compiled and installed as executable by an assured party.

The two states are reflected in two separate kernels. The administrative kernel is not subject to type enforcement. Instead, it is network isolated and accessible only to authorized personnel. This means that in administrative kernel mode, the secure computer cannot be seededwith malicious software by any but the people charged with system administration.

On the other hand, the operational kernel is subject to type enforcement. This means, for instance, that executable files stored in the memory of the secure computer cannot be executed without explicit execution privileges. In one such embodiment, executable files cannot be give execution privileges from within the operational kernel. Instead, the secure computer must enter administrative kernel to grant execution privileges. This prevents execution of malicious software posted to memory of the secure computer. Instead, only executables approved by operational administrators while in administrative kernel mode ever become executable within operational kernel mode of the secure computer. In one such embodiment, administrative kernel can be entered only from either a manual interrupt of the boot process to boot the administrative kernel or by booting the secure computer from a floppy that has a pointer to the administrative kernel.

The flow of data between processes is limited to transfers through assured pipelines controlled, in one embodiment, by the access enforcement mechanism of the Intel Pentium processor. Virtual memory translation circuitry within the Pentium processor includes a mechanism for assigning access privileges to pages of virtual memory. This ensures that control is imposed on every fetch from, or store to, the machine memory. In this way, the protection is made continuous. The Pentium access control mechanism enforces the following modes of access:

Read Only (R): Data values may be fetched from memory and used as inputs to operations, but may not be modified or used as program text.

Read Execute (RE): Data values may be fetched from memory and used as inputs to operations, and may also be used as program text, but may not be modified.

Read Write (RW): Data values can be fetched from memory and used as inputs to operations, and may also be stored back in modified form.

No Access: The data cannot be fetched from memory for any purpose, and it may not be modified.

These hardware-enforced accesses can be used to force data flowing from, the internal private network to the Internet to go through a filter process, without any possibility that the filter is bypassed or that filtered data is tampered with by possibly vulnerable software on the Internet side of the filter.

The access a process has to a data object via type enforcement is defined by an entry in a central, protected data structure called the Domain Definition Table (DDT). A Domain name denotes an equivalence class of processes. Every process in execution has associated with it two Domain names which are used to control its interaction with object and with other Domains. The real Domain of a process is used to control Domain to Domain interactions and to grant or deny special, object-independent privileges. The effective Domain of a process is used to control its access to objects. The real and effective Domains of a process will generally be identical; the circumstances in which they differ are described below.

A Type name denotes an equivalence class of objects. Objects are, in general, the "base types" of BSD/386 Unix: files, directories, etc. There are eight default subtypes: file, directory, socket, fifo, device, port, executable, and gate. The implied default subtype pipe is, in effect, untyped because no check is made on access to pipes. Type names consist of two parts and, in the preferred embodiment, are written in documentation and comments as creator:subtype. The creator field is the four-character name of the Domain which created the object. The subtype field denotes the "class" of the object within that Domain. Subtype names are also four characters long and may contain any printable character except '*' or whitespace.

Subtypes will not be shared; thus Mail: file means, in effect, "the files private to the Mail Domain." When objects are created they are automatically assigned the appropriate default subtype. Objects which are to be shared between Domains must have their subtype changed from the default to an explicit subtype.

Subtypes can be assigned one of three ways:

By having a default subtype assigned when the object is created by the operational kernel.

By having an explicit subtype assigned by the privileged chtype or fchtype syscalls. Thus a file which was to be shared between the Mail Domain and some other Domain would first be created as Mail:file and then changed to, e.g., Type Mail:Publ. If an subtype is changed to a default subtype, then the object becomes private.

By having a default or explicit subtype assigned administratively by the administrative kernel.

The default subtypes exec and gate are "static." The operational kernel will not create any objects of those subtypes, change those subtypes into any other subtype, or change any other subtypes into a gate or exec.

The Domain/Type relationship is used to define the modes and consequences of accesses by processes to objects. The modes and consequences of accesses are defined by access attributes which are store in the DDT database. The DDT database is "indexed" by three values:

The effective Domain of the process requesting the access or action.

The creator field of the object Type.

The subtype field of the object Type.

The result of "indexing" is the retrieval of a set of access attributes. The term "attribute" is used instead of "mode" because some of the attributes define immediate side effects. The selection of attributes was governed by the following considerations.

To constrain the modes of access which processes may exercise on objects.

To prevent the execution of any application software other than that which has been installed through the controlled administrative environment.

To enable the spoofing of attackers so that the attack response facilities can be used to trace them at the physical packet level. This required a more sophisticated response to illegal accesses than just shutting down the offending process.

Gating peqnits a process to temporarily become a member of another Domain. The "home" or permanent Domain of the process is called its real Domain and the temporary or assumed Domain is called the effective Domain. Implicit gating is used when it is necessary to strictly control the manner in which the effective Domain's accesses are used. Implicit gating "ties" the temporary Domain change to a specific executable which has been subjected to extra scrutiny to insure that the effective Domain's accesses are used safely. The "tying" of the Domain change is done because the Domain change is a side effect of execve'ing a special executable: one whose subtype is gate. Implicit gating also allows Domain changes to be defined by changing the Type of an executable instead of inserting explicit calls into the source code.

Explicit gating is used when a looser control on the temporary Domain transition is appropriate, or when the "tying" of the gating to a specific executable would require excessive restructuring of existing software.

Domain changes are controlled by the DIT. The logical structure of the DIT is a table with an entry for each Domain. The logical structure of each entry is that of two pointers, one to a list of allowed real Domains and the other to a list of allowed effective Domains. Thus, if a process executed a makedomain or changedomain, the real Domain of the process selects the entry and the Domain given by the domainname argument must be on the list of allowed real Domains for the Domain change to happen. Likewise, if a process executes a gate, the Domain given in the domainname argument must be on the list of allowed effective Domains. Finally, if a process executes an execve of an executable whose subtype is gate, the creator Domain of that executable must appear on the list of allowed effective Domains.

Certain kernel syscalls are restricted to processes executing out of privileged Domains. In one embodiment two levels of checks are made. First, the normal BSD UNIX permissions are checked; if these permissions cause the operation to fail, the system call returns the normal error code. If the UNIX permissions are adequate the type enforcement (TE) privileges are checked next, (and thus in addition to the UNIX permissions).

The following BSD system calls have been modified to properly implement type enforcement. The modified calls have been grouped into four groups for ease of explanation.

The first group of system calls that require modification are those that set or affect the identity and/or state of the computer. Two of these system calls affect the computer's internal time: settimeofday and adjtime. Both of these system calls have been modified to require the <can_set_clock> privilege before the request will be honored. In the event of a privilege violation, the system call will raise an Alarm, will not honor the request, but will return success.

Other system calls which affect the computer's notion of self identity are sethostname and sethostid. Both of these system calls have been modified to require the <is-startup> privilege before the request will be honored. In the event of a privilege violation, the system call will raise an Alarm, will not honor the request, and will return the EPERM error flag. The last system call affects the computers runtime status, reboot. The reboot system call has been modified to require the <admin-reboot> privilege before the request will be honored. If the request is honored, the computer will boot to the admin kernel (single-user mode only with networking disabled). In the event of a privilege violation, the system call will raise an Alarm, will not honor the request, and will return the EPERM error flag.

The second group of system calls that require modification are those that allow interaction with the computer's filesystem. The open system call has been modified to become the primary TE check. After performing the normal BSD UNIX permission checks, the TE check is performed. An Alarm is raised if the TE check returns null (no permissions), or if the caller asks for read but the <ddt_read> privilege is not set, or if the caller asks for write but the <ddt_write> privilege is not set. The creat system call has been modified to set the new file's Type to <creator:file>. Additionally, the creation of a new file implies a write operation on the directory, which in turn implies that the TE-modified open system call will be used to open the directory file, which in turn implies that TE can be used to control the success or failure of the creat system call. The unlink and rename system calls are modified in like manner. The unlink system call requires the <ddt_destroy> privilege. The rename system call requires the <ddt_rename> privilege on the "from" file, and if the "to" file exists, it further requires the <ddt_destroy> privilege on the "to" file. In the event of a privilege violation, both the unlink and rename system calls will raise an Alarm, will not honor the request, but will return success. The access system call is modified to require the <mode> privilege on the file pointed to by the path. In the event of a privilege violation, the access system call will raise an Alarm, will not honor the request, but will return success. The chflags, fchflags and quotacl system calls are modified in alike manners. All are modified to perform no functions. Attempts to call them will raise an Alarm, will not honor the request, and will return EPERM. The mknod system call is modified to perform no function. Attempts to call it will raise an Alarm, will not honor the request, and will return EPERM.

The third group of system calls that require modification are those concerning process creation, maintenance and tracing. The fork system call has been modified so that the child process inherits both the real and effective Domains of the parent process. The execve system call is modified to require the <ddt_exec> privilege on the file pointed to by the path before the request will be honored. The real and effective Domain of the process remain unchanged. In the event of a privilege violation, the system call will raise an Alarm, will not honor the request, but will return success. The ktrace, ptrace and profil system calls are modified in alike manners. All are modified to perform no function. Attempts to call them will raise an Alarm, will not honor the request. The ktrace and ptrace system calls will return EPERM, whereas the profil system call will return EFAULT.

The mprotect system call is modified to perform no function. Attempts to call it will raise an Alarm, will not honor the request, and will return EPERM.

The fourth group of system calls that require modification are those that relate processes to user ids. The setuid and seteuid and old.setreuid system calls are modified in alike manners. All are modified to require the <suppress_su_alarm> privilege before the request will be honored. In the event of a privilege violation, the system call will raise an Alarm, will not honor the request, and will return success. The acct system call is modified to perform no function. Attempts to call it will raise an Alarm, will not honor the request, and will return EPERM. The setlogin system call is modified to require the <can_setlogin> privilege. In the event of a privilege violation, the access system call will raise an Alarm, will not honor the request, but will return success.

A final set of system calls consists of those that are removed entirely from the BSD UNIX kernel. This set of system calls includes: obs_vtrace, nfssvc, asynch_daemon, getfh, shmsys, sfork, getdescriptor, and setdescriptor.

Network Separation

The goal of network separation is to provide an operating system kernel with support for multiple networking protocol stacks. A system 10 having such an operating system kernel is illustrated in FIG. 1. System 10 is split into separate regions, with a domain 16 and a protocol stack 12 assigned to each region. Each protocol stack (12.0, 12.1) has a fixed set of interfaces bound to it. For example, two or more ethernet drivers can be connected to, for instance, protocol stack 12.0.

A given socket will be bound to a single protocol stack 12 at creation time. Each protocol stack 12 will have its own independent set of data structures including routing information and protocol information. No data will pass between protocol stacks without going through proxy space and being sent back down another protocol stack by a proxy program 14. Proxy 14 acts as a go-between, therefore, for transfers between domains 16.0 and 16.1. No user applications will have direct access to either network.

The embodiments discussed will only cover common networking support, such as the media layer drivers like PPP, ethernet, and SLIP and the TCP/IP suite of protocols. The BSD kernel supports other protocols such as CCITT/X.25 and XNS. These are not covered here, although it should be apparent that network separation can be extended to other protocols by dividing the protocol stacks associated with the protocol layers into multiple protocol stacks with the number of (and the name of) stacks being the same across all protocol suites.

The following terminology will be used throughout the document: BSD The BSD/OS 2.0 Unix operating system as based upon the BSD 4.4 Lite distribution. In the case of the networking functionality the code is virtually identical across all 4.4 derived Unixes (NetBSD1.0, FreeBSD 2.0, and BSD/OS 2.0). The only significant differences are the hardware device drivers in terms of how they autoconfig during boot, which ones are present, and their internal code. Their interfaces to the rest of the networking code is effectively identical.

BSD kernel The BSD/OS 2.0 kernel.

Burb The aggregation of a protocol stack with all the processes that can access that stack. Processes that can access a particular protocol stack are said to be bound to that protocol stack.

NBURBS The number of protocol stacks or network interfaces to which all networking processes and related entities are bound to.

Kernel space The address and code space of the running kernel. This includes kernel data structures and functions internal to the kernel. Technically the kernel can access the memory of the current process as well, but "kernel space" generally means the memory (including code and data) that is private to the kernel and not accessible by any user process.

User space The address and code space of processes running that isn't kernel space. A running process will often execute inside of the kernel during system calls, but that's kernel space since the kernel *always* is running with the context of the current process except during the few moments of the actual context switch—in a kernel without SMP support and kernel threads. In general user space refers to code and data allocated by a code that is loaded from an executable and is available to that process, not counting the kernel private code data structures.

Protocol stack The set of data structures and logical entities associated with the networking interfaces. This includes sockets, protocol drivers, and the media device drivers.

Link level & hardware drivers These are the (almost in some cases) bottom layer drivers that talk a particular physical and/or link level protocol (ethernet, PPP, SLIP). They may be a hardware driver, in the case of most ethernet drivers, or they may sit on top of yet other drivers, such as PPP on a TTY on the COM port driver or even a parallel port Ethernet driver on top of the LPT port driver. Most of these drivers have two layers, a generalized layer that handles the common parts of the link level protocol (ethernet, ppp, etc.) and the hardware specific driver.

One of the goals of a secure operating system kernel is to allow dividing the network interfaces into distinct regions so that there is assurance that packets are never quietly passed through the kernel between those regions. In one embodiment, the following rules must be met to ensure secure control of packet transfer between regions:

- A single user process can only send and receive information (packets) from one region at a time.
- Once a process is bound to a region, it can only access that region.
- Incoming packets can only go to processes that are in the region associated with the interface the packet arrived on.
- Any data passing through the computing system to a different region must come into user process and be handed off to a different process that has access to the other region, a proxy program, to be sent out again.

The reasons for these design requirements are fairly simple. The goal is that any information passing through the computer between different regions has to be passed through a predefined, or assured, pipeline.

There are three ways of achieving this goal:
1) Packet Filtering Packet filtering would be done using conventional approaches similar to current firewalls and screening routers. This could be enhanced with additional filters based on interface rather than address to prevent certain types of spoofing.
2) Packet Separation A given message, incoming or outgoing, would be assigned a type based on the interface it arrived on or the socket it was sent from. The packet would then be thrown out at the top or bottom level if that type didn't match the type of the interface it was being sent on.
3) Separate Protocol Stacks The protocol stacks would be separated into multiple instances with a given interface or socket existing on only one.

In arriving at our current approach, the packet filtering solution was quickly discarded. Although you could eliminate several kinds of spoofing, many of them would still remain. For filtering to work at all, IP packet forwarding must be enabled, but then you are vulnerable to all sorts of nasty things sneaking through the computer system using the normal sorts of attacks with various forms of spoofing, piggybacking, and just plain misconfiguration of complex filtering expressions.

The packet typing approach had merit, but required extensive code changes as all of the various layers would have to be rewritten to handle additional fields in all of the various structures (mbufs, sockets, etc.). The other problem with the packet typing approach was how to deal with kernel internally generated messages like ICMP messages.

The separate protocol stack approach was selected because it gives a very clear split of the regions making assurance easier. It also requires surprisingly few code changes. Rather than change the existing data structures, they are simply replicated as needed for the various regions. The initial reference has to be fixed, but most references are done by cached pointers within the various structures, so many of the functions and layers of the protocol stack require no changes at all. For instance, the hardware drivers require absolutely no changes. The socket code requires only a minor change during the socket instantiation, subsequent references done using the already fixed pointer to the particular protocol driver. This also gives a performance win because there are basically no lookups done dynamically, only an extra level of indirection during initialization, but not subsequently.

The general structure of the design chosen involves duplicating all of the protocol stacks where each stack is independent of the others. The routing to a given stack is done at the very top or bottom of the dataflow so that a given packet, piece of data, control message, etc. is bound to a particular stack at creation.

A name was needed for each of these protocol stacks, and the processes and related entities bound to them, the name that was chosen was burb.

Second, the decision whether to replicate and subdivide into separate burbs is made on a protocol family by protocol family basis. Generally all external supported networking protocol families will be divided. The internal Unix domain socket family won't be replicated. This is important because the Unix Domain sockets (AF_UNIX) will continue to exist in one common region for the entire system. This feature becomes important for the pipeline structure given later.

To identify the network/socket access a process is given a burb id that says which burb it is in. In one embodiment, the burb ID is an ordinal number.

Figure 2A:
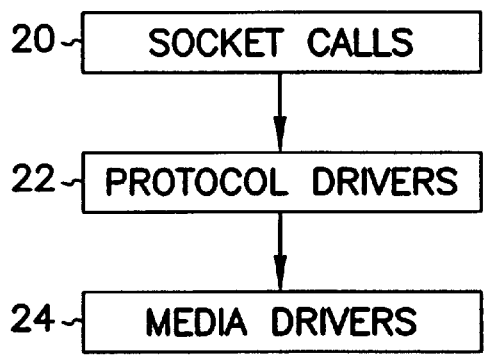
FIGS. 2a–d are representations of communication protocols.
Figure 2B:
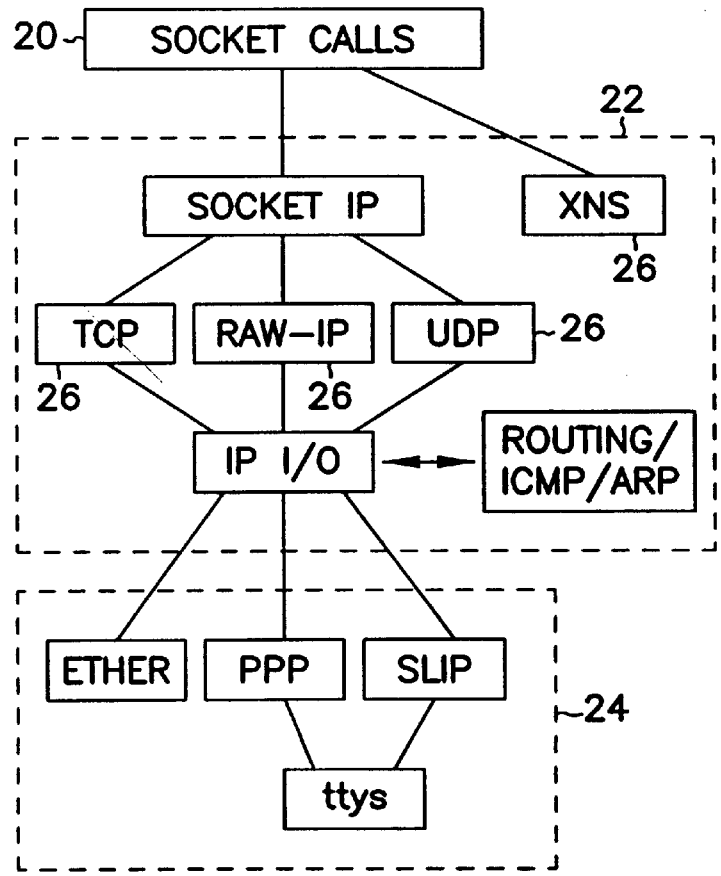

The general picture of the protocol stacks in a normal BSD kernel is shown in FIG. 2a. An expanded view of this picture to include the various IP protocol drivers is shown in FIG. 2b.

When a socket is actually created, it is explicitly, during the initial socket( ) call 20, bound to one of the protocol drivers 22 via a pair of pointers in the socket structure, the so_proto member (a pointer to a struct protosw), and the so_pcb member. The protosw structure is unique per protocol driver, but there is only one per protocol driver. The so_pcb pointer is an opaque pointer to a socket specific structure that has the protocol specific information for a socket (such as the TCP state information for a TCP socket).

At the bottom level, the generic media drivers 24 (ethernet, ppp, slip) put incoming packets on a per protocol family (IP, XNS, CCITT, etc.) queue, ipintrq in the case of IP.

Figure 2C:
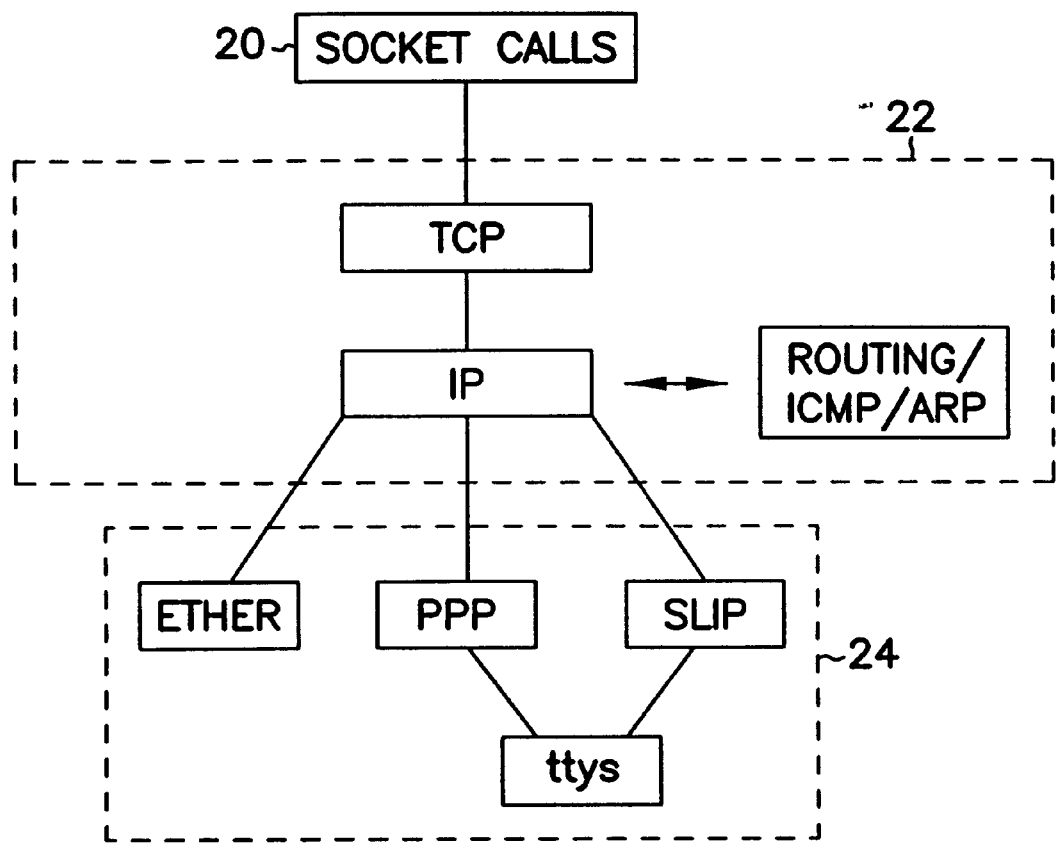

The picture then for a created socket becomes something like the system of FIG. 2c.

Figure 2D:
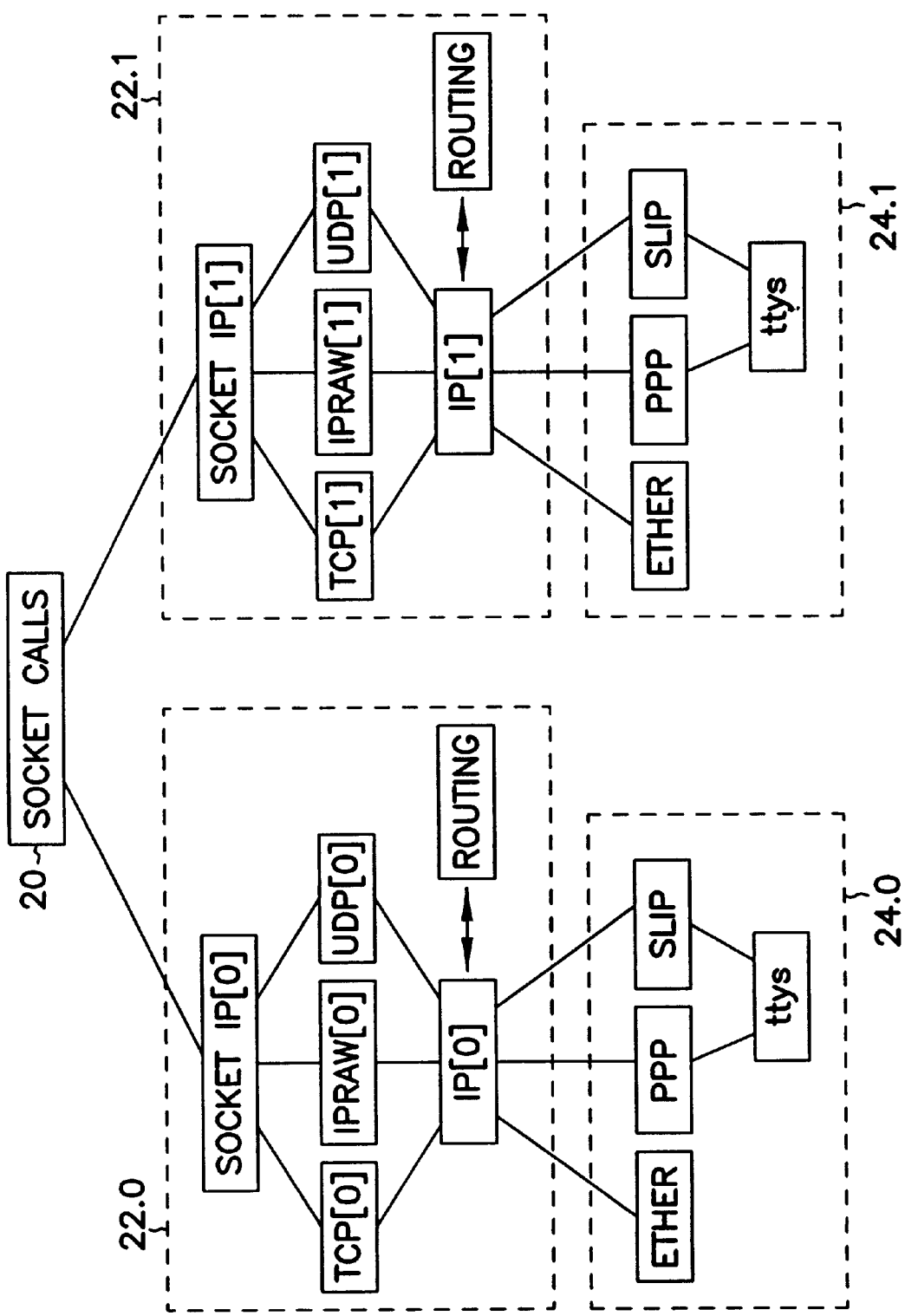
Figure 3:
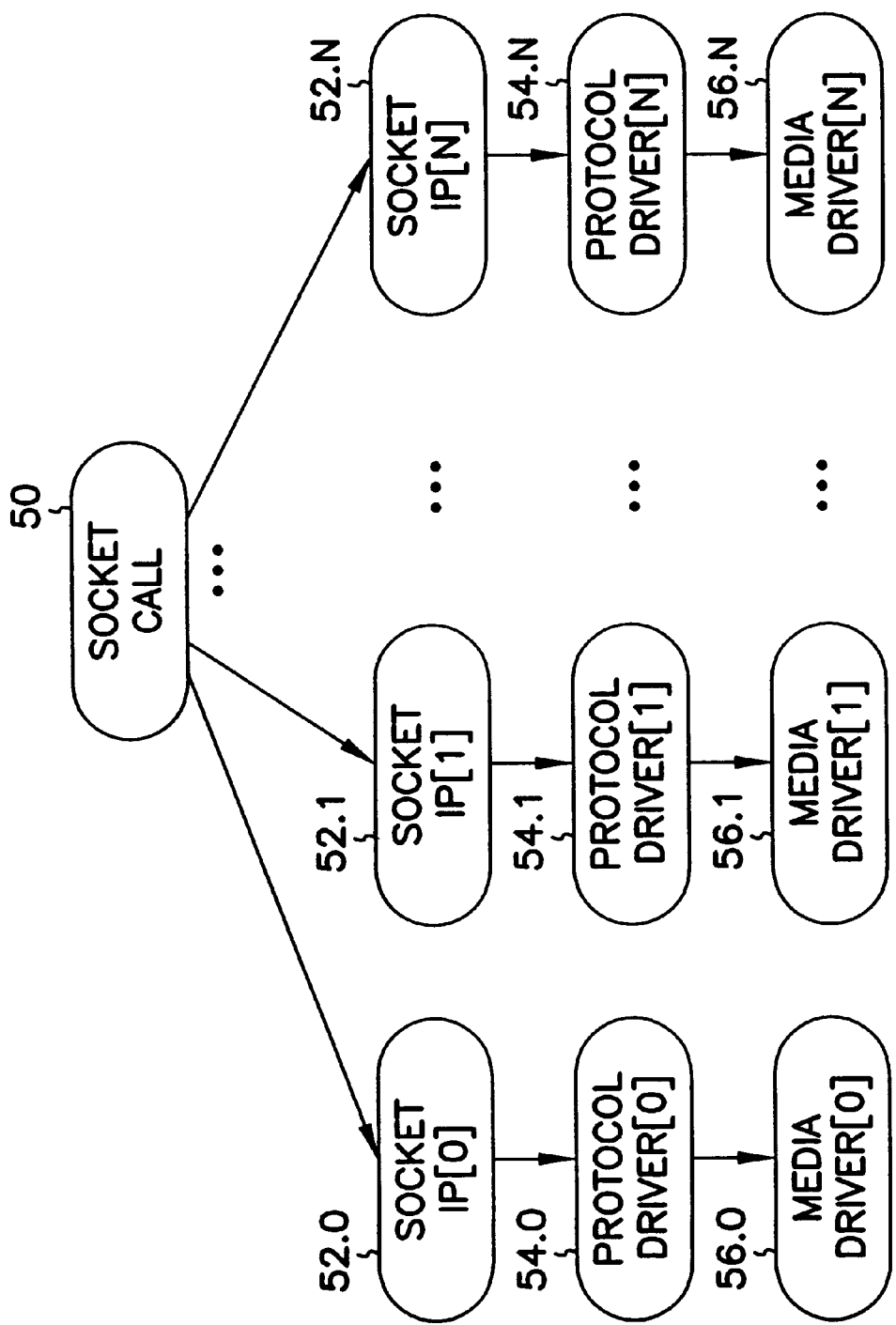
FIG. 3 is a representation of one form of interprocessor communication which can be used in a system having a plurality of separate protocol stacks.
Figure 4:
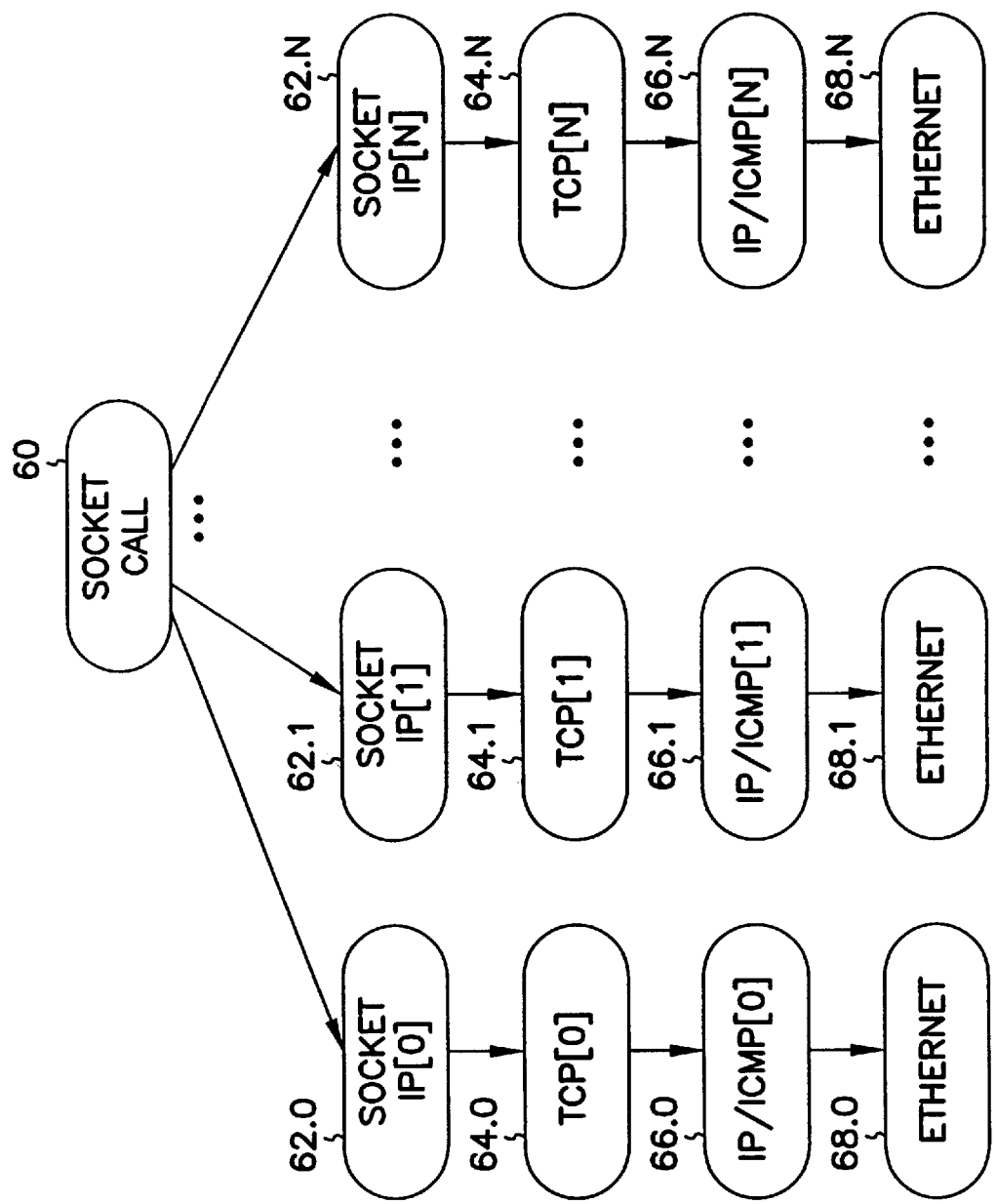
FIG. 4 is a more detailed representation of one embodiment of the form of interprocessor communication shown in FIG. 3.

So, the fundamental concept of the kernel portion of the design is that the protocol stacks are replicated N times (with N being a fixed small constant, typically 2–10), with all protocol level and other shared data structures being replicated. In practice, each burb/protocol stack has a name, that name maps onto a number, starting at 0, that is used as an index. Each static structure is converted into an array. This also makes it easy to change the number of burbs supported. FIG. 2d illustrates a system having two burbs and limited to just IP. A generic system having N burbs is shown in FIG. 3. A specific TCP/IP system having N burbs is shown in FIG. 4.

Once the socket is created then the picture becomes much simpler again, because the individual data structures are then bound explicitly and no lookup or search stage occurs again. All activity then occurs within one of the burbs (e.g., TCP[0]).

The advantage of duplicating the protocol stacks in their entirety is that the number of data structures to be duplicated, and the points that those are referenced, is manageable, much more so that making a given datum have a type and/or domain and having to "route" within the kernel based on that at every layer. As mentioned before, the basic approach is that all shared data structures are replicated N times, 1 for each burg. These data structures are a reasonably finite list. They include:

Protocol Domain List and Tables (domains, protosw)—
When a socket is created, a family and a type is specified, such as socket (AF_INET, SOCK_STREAM). The socket creation routine first looks up the top level protocol in the family list, ala: AF_INET, which returns a 2nd level table of protosw structures that has the individual protocol drivers. The 2nd level table is in the form of XXX domain, such as inetdomain. The first level list is called "domains".

The design replicates only the tables (when that family supports separate burbs, such as IP, route). In the case of things like the AF_UNIX domain, each list will point at the same table. The lookup will then return a protosw structure unique to the instance of the protocol driver, such as inetsw[proto][burb], instead of inetsw[proto]. The routing structure will be replicated into routesw [NBURBS].

Protocol Interrupt Queues (ipintrq)—External networking protocols each have an input queue for incoming packets. Each queue is a simple mbuf list. So queues for protocols will be replicated, becoming things like ipintrq [NBURBS] instead of just ipintrq.

IP Fragmentation Queues (ipq)—Similar to the IP interrupt queue, there is a reassembly queue, ipq, to reassemble fragmented IP packets. All network interfaces have a maximum transmission unit (MTU). Outgoing packets larger than the MTU are fragmented by the IP layer into smaller packets for transmission. When the fragmented packets arrive at the destination, they are placed on a reassembly queue waiting for reassembly. This queue is also replicated into ipq [NBURBS].

Interfaces (ifnet)—Each interface, including the loopback will be bound at boot time to a given burb by a one time system call. A burb field will be added to the ifnet structure, ifnet.if_burb, which is unique per interface so that it knows which burb it's in and which interrupt queues to send data to. The binding will also be one shot, so that once an interface is bound, it can't be rebound to a different burb.

Other data structures are already unique per interface. The other item to be replicated is the list of interfaces. There will be one list per interface. The interface binding call will set the burb of the interface and tell it which interface list to put itself on during initialization.

Loopback Interface (loif)—The loopback interface IP address will have to be unique per interface. In other words, the recommended loopback address 127.0.0.1 cannot be shared between the interfaces. The loopback interface data structure will be replicated, loif [NBURBS]. Loopback addresses will be subnetted, with netmask 255.255.0.0, to give each interface a unique IP address, 127.burb.0.1.

Protocol Control Blocks (tcb, udb, rawcb)—Each protocol maintains its own list of protocol control blocks, which hold various pieces of information required for the socket operations. These lists will be replicated and maintained on a burb basis: tcb [NBURBS] for TCP, udb [NBURBS] for UDP, and rawcb [NBURBS] for routing sockets.

Routing Tables (rt_tables)—There is a single master routing table, rt_tables [family], that is a linked list of routes. This table will be separated into one table per burb, rt_tables [family][NBURBS]. There will be no master routing table.

These routing tables will be used as lookup tables so that the incoming end of a proxy knows which outgoing proxy to connect to. For outgoing packets, the search always starts with the local table. If a route cannot be found, then the system searches other tables. If a route is found on a non-local table, then the networking code will hand the packets off to the proxy processes.

ARP Tables and Queues (llinfo_arp, arpintrq)—There are no data structures at the common link level (ethernet, ppp, slip) except the ARP table and the ARP interrupt queue, llinfo_arp and arpintrq. This again is a list of interfaces with just the information needed for ARP and a queue for incoming ARP packets. Both of these data structures will be replicated, llinfo_arp [NBURBS] and arpintrq [NBURBS].

Sockets (struct socket)—The data structures for a socket are created dynamically for each socket, so no fixed replication needs to be done. The alternation of the protocol driver lookup code means that a socket will automatically get the pointer to the protocol driver in the correct burb without any changes to the socket code except the domain list search routines. A burb field will be added to the socket structure, socket.so_burb, so that it knows which burb it's in.

There are some other issues. A message doesn't normally have an intrinsic burb, but it will be added as a debugging aid during development. Each major data structure that is burb dependent (the input queues, the protosw structures, etc.) will always have a field giving its burb. So at various points, these fields can be compared against during development as a debugging aid. Critical hand off stages (like socket initialization) will have sanity checks that are done all the time because the overhead is negligible.

The kernel is implemented to respond to connection requests that are not intended for the computer system itself. For instance, when an internal client requests a connection to an external Internet host, the kernel will answer the request as if it were the external host. Meanwhile, it will attempt to set up the connection with the external host. This process occurs transparently to the internal client. Such support allows the secure computer to answer in a secure manner connections intended for outside boxes.

Each burb will have its own routing tables. The general algorithm for each incoming packet will be, see if it's to one of the local addresses, if so accept it (as this is standard behavior). If not, route it within the burb. If that fails, then see if there is a route in another burb (using other burbs' routing tables). If not, then toss the packet. If so, accept the packet and pass it up the stack, which eventually should arrive at the proxies.

The existing TCP and UDP drivers will happily accept the packet and pass it onto a socket if it exists. If it's to an already established TCP connection or a UDP socket, it will get there normally. If it's a new incoming TCP connection that is accepted, it will create the socket, and fill in the local address from the incoming packet. The process doing the accept ( ) can call getsockname ( ) to get that address. In other words, the UDP and TCP drivers trust the lower layer IP driver that the packet is for the machine, so no change to those layers need to be done at all to support this, only the secondary routing lookup in the IP layer.

This functionality means a couple of things. For this to work, there still have to be unique IP addresses all around, so no hacks are done to support hidden IP addresses that conflict with external ones. Also, there can only be one default route on the machine still. If there were one per burb, the burb routing lookup wouldn't know where to send it. This isn't hard. Generally the default route will be for one of the outside burbs. Other burbs will simply have to have complete routing for the internal network. This isn't a problem as it's really already the case. A host with a complex internal network already has to have proper routing for all of those networks if it uses a default route.

This also means there can be no duplicate routes in the replicated routing tables. If there were duplicate routes, the routing lookup would always return the first route found.

Network Separation Using Type Enforcement

The degree to which network separation protects a network from malicious attack is enhanced through the use of type enforcement.

As noted above, in a type enforcement scheme processes and files are assigned to a domain and subtype, domain:subtype. Process-to-file, or domain-to-domain:subtype, access is controlled by the Domain Definition Table (DDT), that specifies the permissions:

- create—ddt_create
- write—ddt_write
- read—ddt_read
- destroy—ddt_destroy
- execute—ddt_execute
- rename—ddt_rename Subtypes allow a finer division of file types (file=file, diry=directory, sock=socket, exec=executable, etc.).

Interactions between the processes, or domain-to-domain, such as signals, are enforced by the Domain Interaction Table (DIT), that specifies the allowed signals (sHUP, sABRT, sjob, etc.)

An instantiated domain is one that has several instances with dentical access rights to itself and other domains. Take two instantiated domains, www0 and www1. They both have identical access to all other domains and subtypes. They also have equivalent access to their instances and no access to other instances. In the domain specification language, these domains are specified with a 'X' as the last character, where X represents the burb id. So if you say:

wwwX:
  has read access to www#:conf
  has write access to Slog:sock the DDT/DIT is created like:

www0:
  has ddt_read access to www0:conf
  has ddt_write access to Slog:sock
www1:
  has ddt_read access to www1:conf
  has ddt_write access to Slog:sock
  If another domain is given access to a general instantiated type, then it gets equal access to all instances, for instance:

Admn:
  has write, read, create access to www\#:conf the DDT/DIT is created like:

Admn:
  has ddt_write, ddt_read, ddt_create access to www0:conf
  has ddt_write, ddt_read, ddt_create access to www1:conf There are a set of special domains that are used to actually grant access to the networks themselves. These domains are in the form of Protocol:port. Protocol is a domain name corresponding to the protocol type. Current domains and what type of socket they map to include:

| Domain Name | Network Domain | Socket Family/Protocol |
|---|---|---|
| tcpX | TCP | AF_INET/SOCK_STREAM |
| udpX | UDP | AF_INET/SOCK_DGRAM |
| ipoX | Raw IP | AF_INET/SOCK_RAW |
| rteX | Route | PF_ROUTE/SOCK_RAW |

For sockets that have port numbers, such as tcp and udp, the subtype is an asciish number that is the prot that binding is allowed to. For instance, the ftp0 domain would have access to ftp 0:0020 and ftp 0:0021 to give it access to the ftp control and data ports (20 and 21).

The access given corresponds to the directionality of communication. There must be ddt_create privilege to create the socket at all. For datagram sockets, ddt_read gives the ability to read ( ) or recvmsg ( ), and ddt_write gives access to write ( ) and sendmsg ( ).

With stream sockets, ddt_read gives access to bind ( ), listen ( ), and accept ( ) so that the process can receive an incoming connection. ddt_write gives access to bind ( ) and connect ( ) so that the process can initiate an outgoing connection.

The following subtypes give access to random and reserved ports:

- rall—bind to all reserved ports explicitly
- rany—bind to any arbitrary reserved ports
- nall—bind to all non-reserved ports explicitly
- nany—bind to any arbitrary non-reserved ports For portless types, the subtype grants access to a specific type of socket. The types currently include 'icmp', only valid under the IP domain (ipoX:icmp), which gives access to ICMP sockets. Some more network subtypes:

- sock—flag access to a network type
- conf—access to network configuration capability Subtype 'sock' is used during the socket creation so the kernel can verify access to a given network domain. The port isn't known at this point, and an exhaustive search of the DIT would be expensive, so any domain that has access to any networking domain has to be given access to the 'sock' subtype as well.

Network configuration programs such as ifconfig, nss, and sysctl must have access to "network_domain:conf". For example: tcpX:conf allows the Unix commands ifconfig to configure-network interfaces and sysctl to set networking configurables.

A network interface is bound to a burb at boot time. A given socket is bound to a particular burb at the socket creation time. The rules for this are pretty simple.

Figure 5:
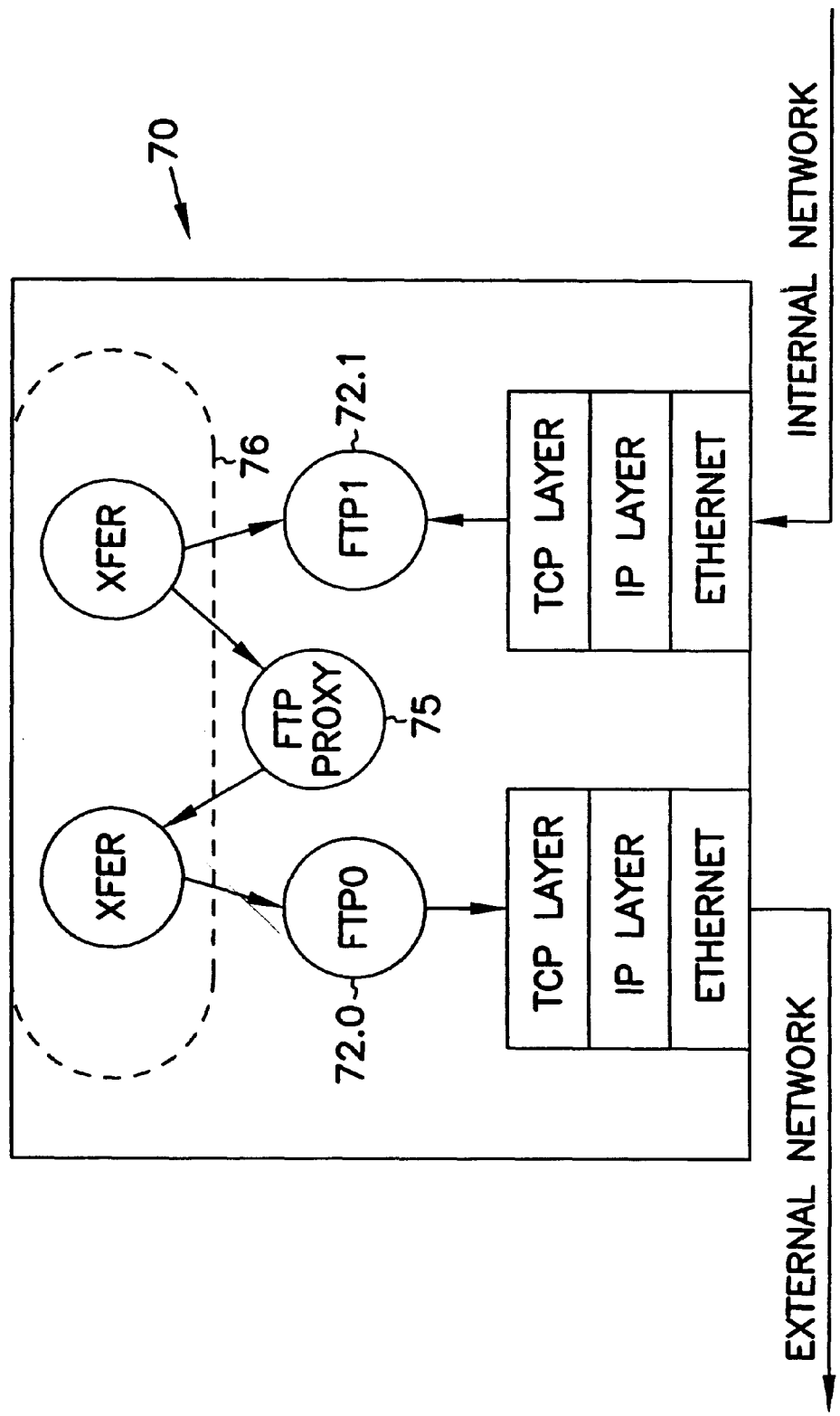
FIG. 5 is an alternate embodiment of the system of FIG. 1, in which all communications between regions (burbs) pass through system space before being passed to another burb.

An example of a type enforced, network separated system 70 is shown in FIG. 5. In FIG. 5, ftp0 and ftp1 are two instantiated domains (72.0 and 72.1, respectively). Each instantiated domain has access to its own protocol stack (74.0 and 74.1). Transfers from one domain to another are made through a ftp proxy 75 via calls to kernel 76.

Processes running in an "instantiated domain" such as ftp0, intrinsically have access to one and only one burb, the burb that matches the numeric part of the domain name. In these cases, the system just binds that socket to the appropriate burb. It should be noted that a process is not actually bound to a burb until it tries to make a direct or indirect socket call to that burb.

Programs running within other domains either have no access or access to all burbs. In these cases, the caller must specify which burb they want. If they don't, it's an error. If they do specify a burb and they don't have access privileges to that burb, it's also an error.

This specification is implemented via a new system call, socketburb ( ). Basically, socketburb ( ) replaces the old socket ( ) system call. It performs the same function and takes one additional argument, burbid. The old socket ( ) still exists, but its gut has been replaced by a call to socketburb ( ). int socketburg (int domain, int type, int protocol, unsigned long burbid);

Ported applications and new programs will use the new socketburb ( ). Existing programs, in instantiated domains, using socket ( ) wouldn't have to be changed and still work. Burbification of socket ( ) calls to socketburb ( ) should use the library call domain_to_burb ( ) to convert and pass the burbid argument:

sock1=socket (AF_INET, SOCK_STREAM, 0);

sock2=socket (AF_INET, SOCK_RAW, IPPROTO_ICMP);

would become:

int domain_to_burb (long domain);

sock1=socketburb (AF_INET, SOCK_STREAM, 0, domain_to_burb (domain));

sock2=socketburb AF-INET, SOCK-RAW, IPPROTO_ICMP, domain_to_burb (domain));

Interfaces are bound to a particular burb. This is implemented by a few new socket ioctls( )s which set and get the burb id of an interface.

Access to a socket for controlling interfaces and other shared parameters is controlled by access to the various conf subtypes. Parameters specific to a protocol, like TCP tunables, are controlled by access to the protocol specific type, such as 'tcp0:conf'. IP layer things like the IP address and burbness of an interface are controlled by the types like 'ip2:conf'.

The following interfaces have been modified or added to support type enforcement, burbification, and transparent proxies. The objectives of these calls have not changed, although access to these calls has been made more restricted. Some new error codes, errno, have been added in the case of type enforcement failures. Only the modifications are described below.

socket ( )—is used by a process to create a socket that is bound to a particular burb. If socket ( ) is called, the socket is either bound implicitly to the burb id that matches the number of the instantiated domain, or fails.

socketburb ( )—a new system call and it is used to create a socket in a given burb. The burb filed is passed as an additional argument to the socketburb ( ) call:

int socket (int family, int type, int protocol);

int socketburb (int family, int type, int protocol, unsigned long burb);

int domain_to_burb (long domain);

sock1=socket (AF_INET, SOCK_STREAM, 0);

sock2=socketburb (AF_INET, SOCK_RAW, IPPROTO_ICMP, domain_to_burb (domain));

These new error codes, errno, are returned by socket ( ) and socketburb ( ):

[EDBOM] returned and an audit generated if the calling process is not in a burb-bound domain.

[EPERM] returned and an audit generated if the calling process doesn't have ddt_create privilege.

bind ( )—assigns a local address and port number to a socket. The bind ( ) call has been extended to allow a process to set the local address arbitrarily, it needs ddt_rename access to "ipoX:spuf". Currently, no domains have this spoofing capability, i.e., no domains have ddt_rename access to "ipoX:spuf". The calling process also must have the following privileges to successfully bind:

ddt_read—tcpX:port ddt_read—udpX:port ddt_read—ipoX:port, for raw IP has_rootness—reserved ports (0–1023)

[EADDRNOTAVAIL] returned and an audit generated if the calling process doesn't have ddt_rename privilege.

[EPERM] returned and an audit generated if the calling process doesn't have ddt_read or has_rootness privilege.

connect ( )—initiates a connection from a socket to a specified address and port number. The calling process must have these privileges to the listed domains: subtypes to successfully connect.

ddt_write—tcpX:port ddt_write—udpX:port

[EPERM] returned and an audit generated if the calling process doesn't have ddt_write privilege.

The ioctl ( ) call is used to manipulate the underlying device parameters. Several new socket ioctl ( ) commands have been added. Most will work with a "struct ifreq" argument and be handled similar to the other set/get ioctls of an interface. If an ordinal value is being set or retrieved such as the burb id, then it will be passed in the ifr_metric field.

The following ioctl ( ) commands now require is_startup or is_admin privilege to execute: SIOCSIFFLAGS, SIOCSIFMETRIC, SIOCADDMULTI, and SIOCDELMULTI. EPERM is returned and an audit is generated if the calling process doesn't have the correct privilege. These new ioctl ( ) commands are added to support burbness in the secure computer:

SIOCGIFBURB/SIOCSIFBURB—get and set the burb id of a network interface. The burb id is passed in the ifr_metric field. To set the interface's burb id, the calling process must have is_startup or is_admin privilege. A sample call would look like:

int ioctl (int socket_descriptor, unsigned long command, char*argp);

struct ifreq if;

int burb, so;

ifr.ifr_metric=burb;

if (ioctl (so, SIOCSIFBURB, (caddr_t) & ifr)<0 perror ("ioctl (SIOCSIFBURB)");

if (ioctl (so, SIOCGIFBURB, (caddr_t) & ifr)<0 perror ("ioctl (SIOCGIFBURB)");

[EPERM] returned and an audit generated if the calling process doesn't have is_startup or is_admin privilege.

[EINVAL] returned and an audit generated if the calling process doesn't have access to subtype ":conf".

SIOCGSOCKBURB—get the burb that a socket is bound to. This is mainly a debugging aid. The burb id is passed in the ifr_metric field.

SIOCGMSGBURB—get the burb of the pending message. It should always be the same as the burb of the socket. This is mainly a debugging aid. The burb id is passed in the ifr_metric field. A sample call would look like:

struct ifreq ifr;

int burb, so;

if (ioctl (so, SIOCMSGBURB, (caddr_t) & ifr)<0 perror ("ioctl (SIOCMSGBURB)");

burb=ifr.ifr_metric;

[ENOENT] returned and an audit generated if the socket cannot be read.

SIOCGMSGIFNAME—get the name of the interface that the pending message arrived on. It is used as a debugging aid or to filter on the basis of the specific interface of the message. The interface name is returned in the ifr_name field. A sample call would look like:

struct ifreq ifr;

int so;

if (ioct (so, SIOCMSGIFNAME, (caddr_t & ifr)<0 perror ("ioctl (SIOCMSGIFNAME)");

printf ("interface: %s", ifr.ifr_name);

[ENOENT] returned and an audit generated if the socket cannot be read.

SIOGSUBURBRT—returns a burb id for a given IP addresses. The kernel searches each routing table and returns the first route found. The IP address is passed in the ifr_addr field. The burb id is returned in the ifr_metric field on success. Since there can be more than one burb, this command is used by an incoming proxy to find which outing proxy to connect to. A sample call would look like:

struct ifreq ifr;

int so;

ifr.ifr_addr=tempaddr;

if (ioctl (so, SIOCGBURBRT, (caddr_t) & ifr)<0) perror ("ioctl (SIOCGBURBRT)");

printf ("route %d", ifr.ifr_metric);

[EHOSTUNREACH] returned and an audit generated if no route can be found for the given address.

The getsockopt ( ) and set sockopt ( ) calls manipulate the options associated with a socket. The following socket options have been added:

include<sys/types.h> include<sys/socke.h> int getsockopt (int so, int level, int optname, void *optval, int *optlen);

int setsockopt (int so, int level, int optname, const void *optval, int optlen);

SO_STATE—returns the state of the socket, the so_state field of the struc socket. This is used by applications that wish to be more intelligent in their handling of a socket depending on its state.

SO_SOCKBURB—returns the burb id of the socket, similar to ioctl (SIOCGSOCKBURB). A sample call would look like:

int value, length, error;

length=sizeof (value);

if ((error=getsockopt (sockfd, SOL_SOCKET, SO_SOCKBURB, & value, & length return error;

return value;

SO_MSGBURB—returns the burb id of the pending message, similar to ioctl (SIOCGMSGBURB) via an unsigned long.

[ENOENT] returned and an audit generated if the socket cannot be read.

SO_MSGIFNAME—returns the burb id of the pending message, similar to ioctl (SIOCGMSGIFNAME) via an unsigned long.

[ENOENT] returned and an audit generated if the socket cannot be read.

Most of the kernel auditings will be generated by type enforcement checks such as check_ddt ( ), check_dit ( ) and check_ddt net ( ) and user privilege check such as psuser ( ). These audits are logged to /var/log/audit.asc and var/log/audit.te.asc.

Network audit is another type of kernel audit. These are logged to /var/log/audit.asc and /var/log/audit.attack.asc. Currently, network audits are generated for ICMP, TCP, UDP, and IP packets.

ICMP—ICMP messages are used to communicate error and administrative messages between systems. ICMP audits are the only network audits that can be configurable. This is implemented via the Unix command sysctl and the field burb.X.net.inet.ip.icmpaudit, where X is the burb id. The default state of the secure computer is level 1, audit only icmp-redirects. ICMP audits can be configured at 3 levels:

0=no icmp audits

1=icmp redirects only (default)

2=all icmp messages, except echo and reply

IP—if the source-routed packets option is disabled (0), the kernel will generate a "source-routed packets dropped" audit for each source-routed packet. The source-routed packet option is configurable via the sysctl command, by disabling or enabling the fields burb.X.net.inet.ip.forwarding and burb.X.net.inet.ip.forwsrcrt. As default, both of these fields are disabled so the secure computer will not forward any source-routed packets.

TCP—the kernel will generate an audit for any TCP attempts to synchronize sequence numbers without a valid protocol control block. These types of packets are viewed as hostile probing attempts.

UDP—similar to TCP, the kernel will also generate a probing attempt audit for any UDP attempts to connect without a valid protocol control block.

There are a number of system utilities that configure or retrieve the network states. These utilities are also modified to support burbness.

arp—displays and modifies the Internet-to-Ethernet address resolution. The art display and cornmand line interface will remain the same. Only the internal implementation will be modified to handle the replicated arp tables.

ifconfig—is used to configure network interface parameters. It is modified to accept a "burb id" entry so that it can be used to set the burb of an interface. It will also print the burb of an interface as part of its normal output. Example: if config ef0 inet 172.17.128.79 netmask 255.255.0.0 burb 0.

inetd—is the internet-service daemon that runs at boot time and listens for connections on certain internet sockets. This daemon will be replaced by the Network Services Sentry, NSS. NSS will be "burb aware" and able to start network services in the appropriate domain. Resident servers will be launched from a similar master utility, such as /etc/rc, so that they run in the correct burb. For more information, see the proxy design specification.

netstat—formats and displays various network-related status and data structures. The formatting will be modified so that when appropriate, the -I or -i flags and when printing IP sockets, it will include a burb id column in its output.

sysctl—is used to retrieve kernel state and allows processes with appropriate privilege to set kernel state. Network states are replicated appropriately into NBURBS. For the curious, execute "sysctl-a" and you'll be glad you did it.

All services supported on the secure computer, such as telnet and ftp, pass their data through a set of proxies (see, e.g. ftp proxy 75 in FIG. 5). There is one proxy for each type of service, http proxy for web, telnet proxy for telnet, and so on. The proxy will accept ( ) the connection or rcvmsg ( )/recvmsg ( ) the packet and look at the incoming address, either in the mesg structure for UDP or via getsockname ( ) for TCP. It will then find out which burb has a route to that destination, via ioctl (SIOCGSUBURBRT), and establish a socket connection in the outgoing burb.

That connection will be via a Unix domain socket. Each service will have a proxy directory in /var/run, such as /var/run/telnetp/. In that directory each outgoing proxy will have already opened a domain socket. These sockets exist in the file namespace, so they already have access control via the domain and type of the socket node. Thus, the burb functionality guarantees that a given process can only access one burb, and the type enforcement on the socket guarantees that process can't cheat and access another service's proxies. The types on the sockets can give a finer control within a service if needed.

So the following example shows a telnet proxy servicing a telnet from the external network Net1, into the internal network, Net0. /etc/rc is the boot up script, telnetd is the telnet daemon, and nss is the Network Services Sentry daemon.

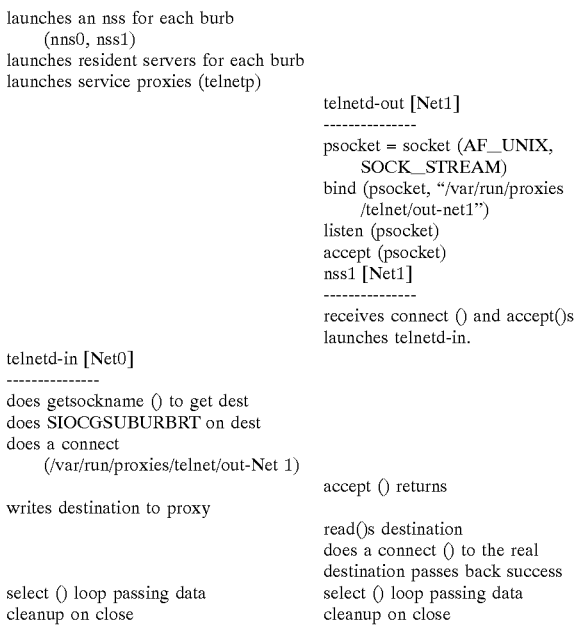

Packets can be filtered as part of the process. Filtering could go before the proxy, it could go after the proxy, or it could go inside the proxy.

Some things, like ftp, are more complex. The proxies have to watch for PORT and PASV requests and set up the data channel and proxy it. Additional channels can be either setup in advance with a standard protocol, or created on the fly by having proxies set up a control channel and bind additional separate domain sockets.

UDP proxies are also more complex. The proxies may have to maintain state information about requests, so that they know which request goes where. A UDP (or other datagram) proxy can work two ways. It can either have a single proxy per burb that just forwards and filters packets one at a time (in which case the connecting Domain socket is a datagram socket as well), or it can create a proxy for each "pseudo" connection and track state to optimize things (like sending acks, etc.). In this case there could be a pair of proxies on the fly that created a stream connection between themselves. They could be routed by port (for protocols that have a unique port and each end negotiated on the fly, like gopher or DNS), otherwise a single proxy still has to handle incoming packets and dispatch them.

Which approach used depends on a few things. If address hiding and masquerading is done, state must be maintained. If not, then simple packet forwarding can be done. Some protocols, like NFS (if ever done) will require extensive state.

Type Enforcement Protection of Compiled Program Code

Figure 6:
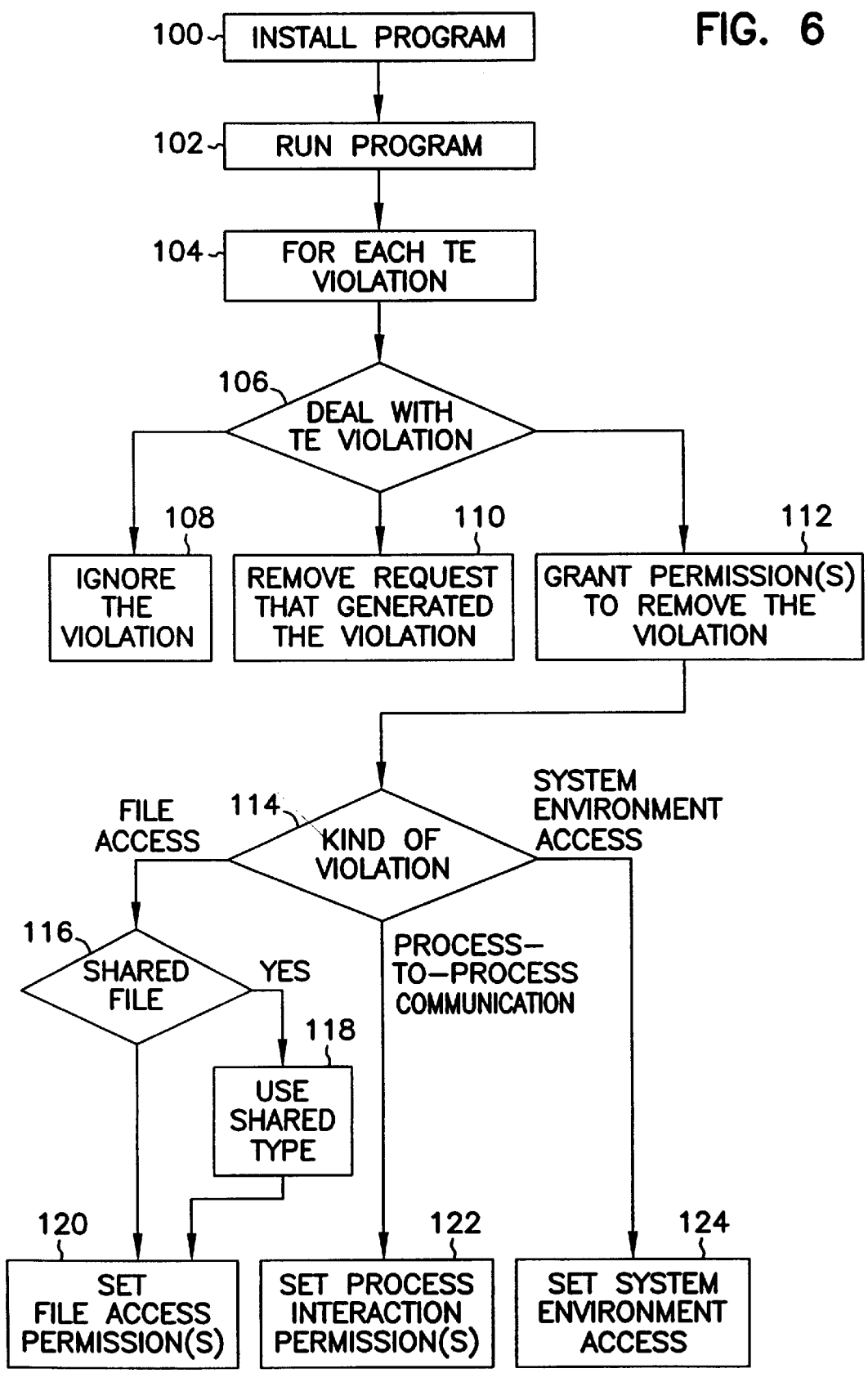
FIG. 6 is a flowchart illustrating the steps taken in securing compiled program code according to the present invention.

Type enforcement can be used to extend the access protections inherent to a particular program, without access to the source code for that program. An overview of the process used to install any pre-compiled application binary (i.e. the program) onto the secure computer system is shown in FIG. 6. The first step (100) to install the binary to a location from which it can be executed. Some (but not all) examples of how this can be accomplished are:(a) copying from the installation floppy disk(s) to the internal hard drive, (b) copying from the installation cdrom to the internal hard drive, (c) mounting external media containing the application binary, (d) copying the application binary via the network to the internal hard drive.

Once the application binary is accessible for execution, the secure computer system is placed in a different state than the fully secure operational state. This state is called the development state, since in best practice (i.e. for highest security) this state is only available to developers. The development state has all of the type enforcement checks that the operational state has; however, the consequences of a violation are different. In operational state, a type enforcement violation results in denying the requested access. In development state, a type enforcement violation results in allowing the requested access. In both the operational and development state, a log entry is produced which records the type enforcement violation. This logging capability is needed to determine which type enforcement violations the program is generating.

It should be noted that the system does not have to be placed in development state to perform this procedure. All that is absolutely required is the logging capability. However, by placing the system in development state, the time and effort required to perform this procedure is greatly reduced. In practice, the procedure detailed in FIG. 6 is followed under in the operational state only when an error was made when performing the procedure under the development state.

At step 102 the program is executed. Because this program was developed using non-type enforcement techniques, this program will make assumptions about its execution environment that will not be true under the type enforcement execution environment. These faulty assumptions will manifest themselves as type enforcement violations. Some sample faulty assumptions that the program can make include (but is not limited to): (a) the program can create files in the system-wide temporary file area, (b) the program can read files that have Unix "global-read" permissions set to true, etc. These faulty assumptions are a direct consequence of the program being non-type enforcement aware: the program is unaware that, in addition to the Unix security restrictions that it is expecting, there are type enforcement security restrictions. Every type enforcement violation must be successfully dealt with in order for the program to function properly while under the operational state.

There are three general ways to successfully deal with a type enforcement violation. They are: (1) ignore the violation, (2) remove the request that generated the violation, (3) grant additional permission(s) to remove violation. The criteria for choosing one branch over another branch are functionality and security. The less critical the functionality, the more likely that the violation can be ignored or the request removed. The more critical the functionality, the more likely that additional permission(s) will be granted.

Some violations can be safely ignored. For example, some programs attempt to determine how busy the system is, in order to behave differently under different conditions. If, however, the program is unable to determine how busy the system is (because of a type enforcement violation), the program will simply assume that the system is not busy and continue. For some programs this is an acceptable response, and requires no further action; in these cases (108), type enforcement violations can be ignored.

Some violations can be removed by changing the environment that the program is running under. For example, some programs attempt to change their effective user identification after some resource has been acquired. The most common situation of this kind is when the program runs as "root" long enough to open a file, but then changes to "wwwdaemon" immediately thereafter. Under type enforcement, this ability to change to another user will result in a violation under the default operational state. In cases such as these, it is more security effective to remove the need for the program to change to another user by following these steps:

(1) start the process as user "wwwdaemon" directly (thus, the program will no longer require the ability to change to another user);

(2) set the Unix permissions on the file such that it can be read by user "wwwdaemon"; and (3) set the type enforcement permissions on the file such that it can be read by the domain in which the process started in step (1) is executing.

So, in this example, the original type enforcement violation is removed at 110 by changing the environment external to the program. Note that in a non-type enforcement system, step (2) results in a security vulnerability. It is only through step (3) that the security vulnerability is closed.

In the above example, one can think of the original type enforcement violation as being transformed into another type enforcement violation. The ability to "change user" was transformed into the ability to "read a file".

Some violations can be removed by granting the program appropriate type enforcement permission(s), so that what was a violation now is a granted permission. Once it is determined that the violation can neither be ignored nor transformed, this action is performed (112). There are three general kinds of type enforcement violations. They are: (1) File access, (2) Process-to-Process communication, and (3) System Environment Access. Therefore, a check must be made at 114 to determine the variety of type enforcement violation.

If the violation concerns general file access, a check is made at 116 to see if the file is a shared file. Programs typically need access to many different sorts of files: configuration files, temporary or scratch files, permanent data files, etc. The only factor that distinguishes these sorts of files from another in the type enforcement sense is whether or not the file is a shared file or not. An example of a non-shared file could be a temporary file. Here, only the program needs access, and no other. An example of a non-shared file could be a database file containing a list of every user of the system.

If the file is shared, then a shared type must be used. Sometimes, this shared type will not yet exist, and must be created. This can occur, for instance, when two new programs both access the same new file (for example, a configuration file that one program writes and the other program reads). Sometimes, the shared file will already exist. This can occur, for instance, when the new program accesses a system-wide file (for example, a database file containing a list of every user of the system.) If the shared file already exists, it will already have a type. This type is used at 118.

If the file is not shared, a new type must be created, and the file is set to this new type.

In either case (both shared and non-shared), the final step is to add at 120 a direct permission to the type enforcement database. This type enforcement permission will grant the domain (in which the program is running) permission on the type (and the file is then set to that type). The fact that the file is not shared is manifested in that there will not be another domain with permission on the type. The fact that the file is shared is manifested in that there will be another domain with permission on the type.

The second kind of violation concerns process-to-process communication. Some programs require the ability to communicate with another program via a process-level mechanism. To deal with this kind of violation, one determines the domain of the second program (the program that the first program is trying to communicate with). Then, at 122 a direct permission is added to the type enforcement database. This permission will grant the sending domain (in which the first program is running) permission on the receiving domain (in which the second program is running). Permissions of this kind are called domain-to-domain interactions, and effectively control the permitted lines of communication between processes.

The third kind of violation concerns system environment access. This kind captures all the kinds of violations that do not concern file access or process-to-process communication. An example would be the ability to determine how busy the system is. Previously, this functionality was used to demonstrate a case where the ability could be removed. However, if the ability was required, then dealing with the type enforcement violation would be handled under this kind of violation. To deal with this kind of violation, one determines the specific functionality required. Then, at 124 a direct permission is added to the type enforcement database. This permission will grant the program's domain permission to invoke the required system function.

The Use of Both Type Enforcement and Network Separation to Protect Compiled Program Code The process described in the previous section is sufficient to handle those instances where programs do not have to be compartmentalized to achieve sufficient security (e.g. utilities such as screen savers or logging utilities). In that case, all programs can reside in and be bound to one region or burb. For systems which can be partitioned into distinct burbs, however, an additional degree of protection can be added by incorporating network separation.

In the case, for instance, where the program(s) to be installed can reside in multiple burbs, yet must maintain the ability to communicate with each other via a networking interface, network separation is used to increase the overall security of the system. One example of such a case is where the system consists of two programs: a production-side program and an administration-side program. In these instances, it is required that the production-side program reside in an unprotected (e.g. Internet) burb. But one does not want the administration-side program residing in an unprotected (e.g. Internet) burb. So instead, the administration-side program is placed in a protected (e.g. internal) burb.

However, by splitting the two programs (production and administration) into two burbs, one has again changed the actual execution environment away from the expected execution environment. The two programs expect (and rely on) the execution environment to allow process to process communication (e.g. signals) between the two programs. On a non-Type Enforced, non-Network Separated system, this assumption is valid. However, on a Network Separated system, the act of placing the administration-side program in a different burb than the production-side program will have the Network Separation side effect of disallowing process to process communication between the administration-side program and the production-side program. From a functionality standpoint, this is not acceptable.

To restore the required program to program communication functionality, one is required to perform steps outside of those explained in the previous section. The problem to be solved concerns the conflicting restrictions placed by the type enforcement system and the network separation system.

In Network Separation, if one program has been "bound" to one burb (e.g. Internet) and another program has been "bound" to another burb (e.g. internal), the Network Separation mechanism will preclude the ability for the first program to establish a connection to the second program via a network communication connection; thus it precludes the ability for program to program communication using the network. One way of viewing Type Enforced Network Separation is to acknowledge this lack of direct network to network communication: since the networks cannot be shared, they are separated.

So, the problem here can be restated as follows: given a program bound to one burb and another program bound to a different burb, how can we allow the two programs to communicate with each other without having access to the source code for either program.

Figure 7:
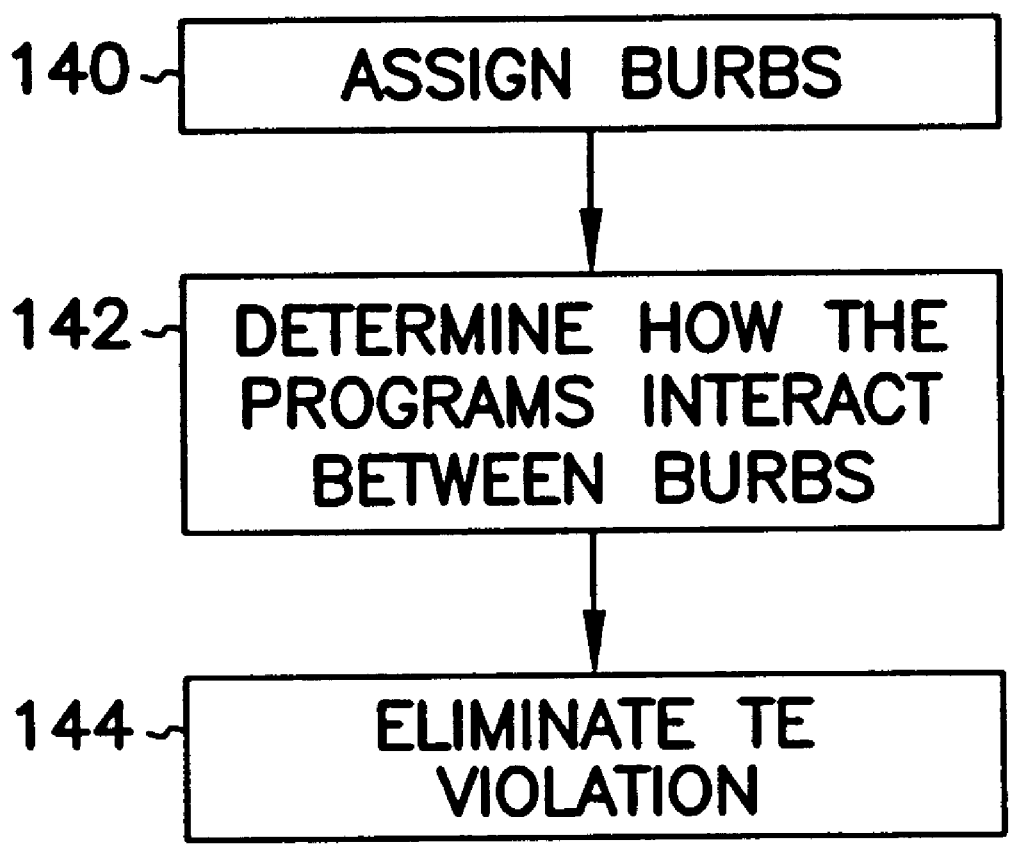
FIG. 7 is a flowchart illustrating the steps taken in applying network separation to compiled program code according to the present invention.

The procedure to solve this problem is shown in FIG. 7:

First, at 140 decide to which burb each of the separate programs is to be bound. In the case of a production-side program and an administration-side program, it is clear that the production-side program must be bound to an Internet burb, and it is clear from a security standpoint that the administration-side program should be bound to an internal burb. In the case of more complicated sets of programs, tradeoffs must be made between availability and security. Binding a program to an Internet burb increases availability but also enormously increases security risks. Binding a program to an internal burb decreases security risks, but results in a decrease in availability.

Second, at 142 determine how the two programs interact. Again, it is important to note that source code is not available for this step. If source code is available for inspection and modification, then this procedure does not apply. Without source code, this step is accomplished by examining the type enforcement violations generated by either or both programs, as required.

Third, at 144 determine whether the type enforcement and network separation violations discovered in the second step can be eliminated. Techniques for removing TE violations (such as those shown in FIG. 6) can be used. In addition, one may be able to eliminate a type enforcement violation by placing one of the programs into a situation where it is "partially bound" to a particular burb. A "partially bound" program is a program which can interact with a specific burb under a reduced set of Network Separation rules. That is, a partially bound program can perform process to process communcation with another burb but not network to network communication. Specifically, it is possible for the partially bound program in a first burb to signal a program that has been completely bound to another, separate burb, while simultaneously maintaining other connections to the first burb. Therefore, communication between burbs assigned to different burbs is permitted in a limited way and the problem is solved.

In one embodiment, one creates this "partially bound" program by using a type enforcement database trick. Normally, a program "P" is completely bound to a burb when the following syntax is used:

"P" runs in domain www# which means that program "P" can access any of the burbs 0 through 9 (as signified by the character '#' above). When program "P" first starts running, it has its choice of burbs (e.g. www0, www1, . . . www9) to establish a connection. But after the first connection, the program "P" is fully bound to that burb and the domain that is associated with that burb, and cannot establish a connection to any network in another burb.

A program "P" is "partially bound" to a burb when the following syntax is used:

"P" runs in domain adm0

Here, the program "P" loses some of its flexibility (it can now connect only to burb adm0) but it gains the "partially bound" status. Furthermore, since such an approach is treated as if there are no other instantiated domains (i.e. no adm1, adm2, etc.), program P running in domain admO can now connect to all other "#"-defined domains.

For the production-side program "PP" and administration-side program "AA" example above, a full example might be:

"AA" runs in domain adm0

"PP" runs in domain prd#

Thus, since the program "AA" is "partially bound" to 'adm0', there can be no domains adm1 through adm9. Program "AA" has, however, gained the ability to interact with prd0 through prd9. Thus, the required signalling ability is re-established.

If it is not possible to place all but one of the programs in a "partially bound" burb, then this procedure must stop without succeeding. The only alternative at this point is to place all programs in the same burb. Then, since the additional Network Separation checks are no longer an issue, this procedure degenerates into the type enforcement only approach described previously.

Further information on increasing security of compiled program code can be found in "SYSTEM AND METHOD FOR SECURING COMPILED PROGRAM CODE", U.S. patent application Ser. No. xx/xxxxx by Haigh et al., filed herewith, the details of which are hereby incorporated by reference.

Secure Commerce Server

One embodiment of a binary program made secure through a combination of type enforcement and network separation is described next. The Netscape Commerce Server, version 1.1, available from Netscape Computer, Inc., is a server for use in conducting commercial transactions over the Internet. This server provides user authentication, SSL protection to http connections, and a forms interface for server administration. As such, it is critical that care be taken to protect a malicious attacker from gaining access to and subverting the program.

Figure 8:
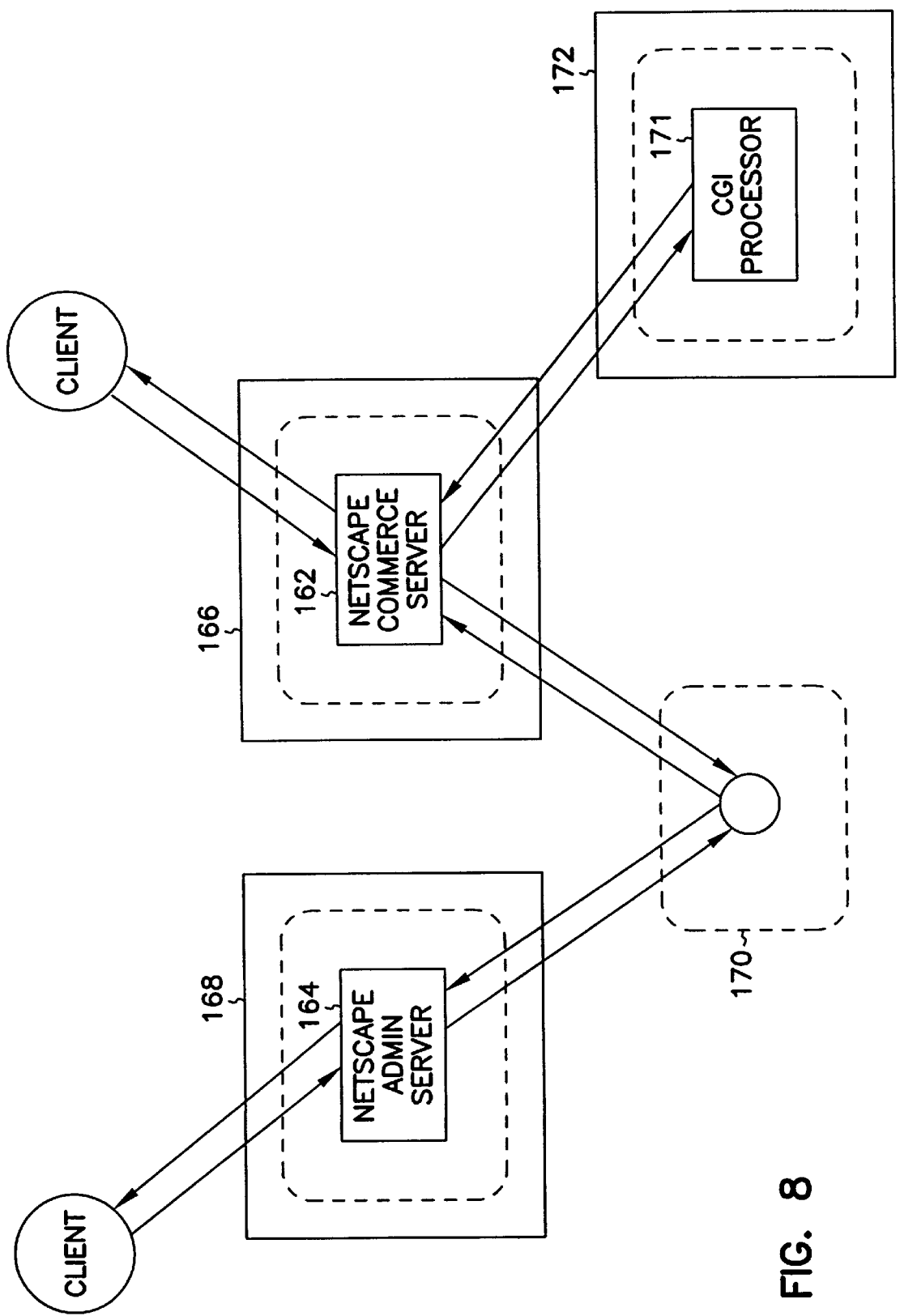
FIG. 8 is a representation of a system built using the steps shown in FIGS. 6 and 7.

A type enforced, network separated embodiment 160 of the Netscape Commerce server system is shown in FIG. 8. The Netscape Commerce server system includes two distinct servers: the Commerce server 162 and the administration server 164. In the preferred embodiment, one administration server 164 should be able to administer and configure a plurality of separate Commerce servers. In the system of FIG. 8, the dashed lines indicate a user level permission check such as the Unix file permissions. In addition, components of the system are placed within domains 166, 168 and 172 for a higher level of security.

Commerce server 162 is installed via an HTML forms driven interface. Administration and configuration after installation is done in the same manner. Installation operates as follows:

1. The user runs the script ns-setup in the source tree (the directory structure from which files are copied to install the Netscape Commerce Server).

2. The user is prompted for the hostname of the host machine.
3. A temporary configuration is written in /tmp and a special WWW server is started using this configuration (the installation server).
4. The installation server binds to an arbitrary, non-reserved port.
5. The user is prompted for the name of a Web browser to start up. It then starts the browser on the port the installation server is listening on.
6. The rest of the installation is HTML forms-driven through the browser. Various items such as port number for the Commerce server, UID to run the server under, install directory, logging, administration password, and other server configuration are entered via three forms.
7. The configuration is verified and the actual installation takes place:
   1. create destination directory and subdirectories
   2. create document root directory
   3. create server startup and shutdown scripts
   4. create server configuration files
   5. copy all binaries, administration forms, and other files from source tree to destination tree
   6. change owner of directories
   7. start administration server
   8. start Commerce Server
   9. remove files created in /tmp
8. Installation complete.

Many Commerce servers 162 can be run on the same machine, binding to different ports (or even the same port, using different IP addresses) and having their own configuration. Each server preforks 16 processes (number is configurable) to serve requests. This can load the system down if many servers are running.

After installation, the Commerce server is administered via forms using any forms-capable browser and connecting to a separate administration server running on its own port. This server is started and stopped manually, except during installation when it is started automatically. (It is recommended by Netscape that it be stopped when not being used.) The administration server is also configurable via forms (it configures itself). It can be configured to require a password to access it, and to allow only certain hostnames or IP addresses to connect to it.

The Commerce server, once running, serves Web pages from a directory tree whose root is configurable. CGI script location, URL mappings, user authentication, access control by host, logging, and other items are also configurable via the administration server. Configuring some items causes creation of files, such as generating a key, installing a certificate, and creating a user database.

High Level Design

This section describes what must be done to port the Netscape Commerce Server to the secure computer. Since we have no source code from Netscape, we cannot modify how the server or installation process operates. Thus, design will focus on what needs to be done outside the Netscape source code to handle type enforcement.

The installation process will be done completely in the administrative kernel (no type enforcement checks), so setting file types in the source tree is not necessary. All file types must be set after the install process is complete since Netscape is not type-enforcement (TE) aware. To accomplish this, a script is used to set all types appropriately. The script must be able to find the appropriate directories, because paths are configurable, and the server files are in a directory named for the port it binds to. This info is passed via arguments or entered by the installer via prompts.

Commerce Server 162 runs in domain 166. In one embodiment, this is the same domain in which the CERN server (not shown) runs. Domain 166 is a bound (burbed) domain which is extended to handle the Commerce Server. That is, the Commerce Server is extended to be able to bind to port 443 (https), 80 (http), 8000, 8001, and 8080. In addition. To allow site flexibility, Commerce Server 162 must e able to bind to selected reserved port ranges.

Administration Server 164 runs in a new Netscape Admin domain, domain 168. Domain 168 must be a burbed domain, since it does a non-burb-aware socket ( ) call. Transfers between domains must be done through proxy programs acting in concert with kernel 170.

CGI scripts run in a CGI processor 171 in burbed CGI domain 172. Since, however, the Netscape server cannot be modified to do a makedomain ( ) to run the CGI script in the proper domain, there will need to be a :tran type added to CGI domain 172. Then, all CGI scripts will be of type tran. In an alternate embodiment, a line could be added to the CGI script itself which causes the script to automatically transition into CGI domain 172. To run a CGI script, Commerce Server 162 initiates a new process which executes in CGI processor 171 within CGI domain 172. The results are then transferred back to Commerce Server 162. In one embodiment, the CERN server also executes CGI scripts within CGI domain 172.

For installing two servers on the same port, but with different IP addresses:
   1. Follow the install directions twice, specifying everything the same except a different server name (which will need to resolve to the correct IP address), bind address, and document root.
   2. Make an IP alias so that both IP addresses used for the bind addresses in the previous step access the secure computer. Type: ifconfig efl alias 172.17.128.199 to alias the IP address 172.17.128.199 to the external interface.
   3. Access both servers using the different IP addresses.

Files Manifest

The following are files associated with the Commerce Server. In this section, /server-root/ will denote the path where the server files are installed. Also, the subdirectory https-443 will denote the directory containing all files specific to the server running port 443. The actual name will contain the port number the server binds to in place of '443'.

Executables
/server-root/bin/https/ns-httpd
   The Commerce server.
server-root/admserv/ns-admin
   The administration server.
/server-root/admserv/servlist
   Part of the administration server.
/server-root/bin/https/admin/bin/*
   CGI scripts for the admin server that generate forms, interpret responses, change config files, administer servers, generate keys, etc.
/server-root/extras/database/batchdb
   Utility to convert NCSA-style user database to DBM database.
server-root/extras/database/changepw.cgi
   CGI script to allow users to change their own password via forms.
/server-root/extras/log_anly/analyze Analyze access logs.
/server-root/extras/log_anly/a_form.cgi
  CGI script to analyze access logs via forms.
/server-root/https-443/restart
  Restart the Commerce server.
/server-root/https-443/rotate
  Rotate the log files.
server-root/https-443/start
  Start up the Commerce server.
/server-root/https-443/stop
  Shut down the Commerce server.
/server-root/start-admin
  Start up the administeation server.
/server-root/stop-admin
  Shut down the administration server.
  Configuration files
server-root/admserv/admpw
  User and password file for access to administration server.
/server-root/admserv/ns-admin.conf
  Configuration file for the administration server.
/server-root/bin/https/admin/html/*
  Forms templates for the administration server.
/server-root/bin/https/admin/icons/*
  Icons for the administration server.
/server-root/mc-icons/*
  Icons for the Commerce server, used for gopher and ftp listings.
server-root/userdb/*
  User databases. (Initially empty)
/server-root/https-443/config/admin.conf
  Commerce server configuration file.
/server-root/https-443/config/magnus.conf
  Commerce server configuration file.
/server-root/https-443/config/obj.conf
  Commerce server configuration file.
/server-root/https-443/config/mime.types
  Commerce server configuration file.
/server-root/https-443/config/ServerKey.der
    Key pair file. Initially non-existent, generated by admin server when requested by the administrator. Path is configurable.
/server-root/https-443/config/ServerCert.der
    Certificate file. Initially non-existent, installed by admin server from the Certificate Authority's certificate response when requested by the administrator. Path is configurable.
    Log files
/server-root/admserv/errors
  Log file for administration server.
/server-root/https-443/logs/access
  Commerce server access log. Path is configurable.
/server-root/https-443/logs/errors
  Commerce server error log.
/server-root/https-443/logs/secure
    Commerce server secure log. (All https accesses are logged here with the keysize used).
  Temporary files
/server-root/admserv/pid
  Contains the process ID of the administration server when running.
/server-root/https-443/logs/pid
  Contains the process ID of the Commerce server when running.
  System files
/etc/spwd.db
  System password file containing encrypted passwords.
/etc/pwd.db
  A shadow password file.
  Other files
/server-root/extras/database/changepw.htm
  HTML form to allow users to change their own password.
/server-root/extras/log_anly/a_form.html
  HTML form to analyze access logs.
/server-root/docs/index. html
  Default home page for the Commerce server. Path is configurable.
CGI scripts
  Path is configurable.
HTML pages
  Path is configurable.

As noted previously, Netscape Commerce Web server 162 runs in the Web server domain (domain 166), the same domain that the CERN Web server runs in. Therefore, the Web server domain needs execute permission to the following:
/server-root/bin/https/ns-httpd
  In addition, the Web server domain needs read permission to these files:
/server-root/mc-icons/*
/server-root/userdb/*
/server-root/https-443/config/admin.conf
/server-root/https-443/config/magnus.conf
/server-root/https-443/config/obj.conf
/server-root/https-443/config/mime.types
/server-root/https-443/config/ServerKey.der
/server-root/https-443/config/ServerCert.der
/server-root/extras/database/changepw.htm
/server-root/extras/log_anly/a_form.html
/server-root/docs/index.html
  The Web server domain needs write permission to these files:
/server-root/https-443/logs/access
/server-root/https-443/logs/errors
/server-root/https-443/logs/secure
/server-root/https-443/logs pid Since the server normally runs as root, if it were able to execute arbitrary code, this would be bad. We can address this by not having it run as root, taking advantage of the type enforcement protection of the sockets. This allows users other than root to connect to low numbered sockets. Other than needing to bind to port 80 or 443, there is no other reason the server needs to run as root. Therefore, the server will run as user "www" and group "www" with no need to run as root.

The CGI bin executables present a potential security concern. Since the Commerce server is allowed to execute these files, if someone were able to put their own executable on the secure computer, the server may be compromised. TE only allows the Web server domain to transition to the CGI domains and no others. It does not have permission to create or write to files of any executable type. This helps prevent the possibility of an external user subverting the server and uploading an executable file.

The entire directory tree containing the html documents which the Commerce server accesses will be write protected from the Web server domain. A separate writable directory will be set aside for all the data created by external users. This is where the CGI executables will put their results. The CGI domain will be allowed to create files in this directory, but not to read or destroy them. These files may later be read and moved internally by the webmaster using mail or FTP.

The password administration program will run in the Netscape Admin domain (domain 168). This domain will have all the accesses required to maintain the Admin server and all Commerce servers on the secure computer.

The Admin domain needs execute access to the following:
/server-root/admserv/ns-admin
/server-root/admserv/servlist
/server-root/bin/https/admin/bin/*
/server-root/extras/database/batchdb
/server-root/extras/log_anly/a_form.cgi
/server-root/extras/log_anly/analyze
/server-root/https-443/restart
/server-root/https-443/rotate
/server-root/https-443/start
/server-root/https-443/stop
/server-root/start-admin
/server-root/stop-admin The Admin domain needs read access for:
/server-root/bin/https/admin/html/*
/server-root/bin/https/admin/icons/*
/server-root/extras/database/changepw.htm
/server-root/extras/log_anly/a_form.html
HTML pages The Admin domain needs both read and write access for:
/server-root/admserv/admpw
/server-root/admserv/ns-admin.conf
/server-root/admserv/pid
/server-root/admserv/errors
/server-root/userdb/*
/server-root/https-443/config/admin.conf
/server-root/https-443/config/magnus.conf
/server-root/https-443/config/obj.conf
/server-root/https-443/config/mime.types
/server-root/https-443/config/ServerKey.der
/server-root/https-443/config/ServerCert.der
/server-root/https-443/logs/access
/server-root/https-443/logs/errors
/server-root/https-443/logs/secure
/server-root/https-443/logs/pid CGI scripts run in CGI domain 172. The following files will be of cgix:tran type and will run in the CGI domain:
/server-root/extras/database/changepw.cgi
/server-root/extras/log_anly/a_form.cgi
CGI-scripts Commerce Server 162 is controlled by the various configuration files maintained by administration server 164. In one embodiment, it may be advantageous to add the ability to start and stop administrative server 164 from another system administration program running in another domain.

Since the secure computer uses type enforcement on sockets, we can allow users other than root to bind to reserved ports. As a result, we run the Commerce server as user id "www" and group id "www". The "www" user is similar to "nobody" and has no log in capabilities. The administration server will still run as root. In addition, scripts that start and stop the servers need to execute /bin/sh (type $Sys:shel). These scripts are also not type-aware, so they need to be modified to execute in the correct domain.

In one embodiment, the following domains are used to define the commerce server system. It should be apparent that other combinations of domains, privileges or access rights could be used. In the list, each domain can have the following privileges: "is_admin" indicates the domain is an administrative domain, "has_rootness" means that the domain can violate Unix permissions if the process UID is root, "can_setlogin" indicates that the domain can set the login name of a process. In addition, each domain's DIT could have the following permissions: "dt" indicates that transition to the named domain is allowed, "sABRT" indicates that sending an ABRT signal to the named domain is allowed, "sJob" indicates that sending a job control signal to the named domain is allowed, "sHUP" indicates that sending a HUP signal to the named domain is allowed, and "sUser" indicates that sending a USR1 or USR2 signal to the named domain is allowed.

Finally, each DDT uses the following permissions: "w" is permission to write, "r" is permission to read, "d" is permission to destroy, "n" is permission to rename, "c" is permission to create and "e" is permission to execute.

---

```
Domain: CGI 'cgix'
    { CGI scripts run here-limited access to things }
    Privs:
    DIT:
        CGI    sABRT    { }
    Subtype: Script 'scrp'
        { Used for CGI shell scripts }
        DDT:
            CGI e r      { }
            Webmaster  w r d n c   { }
            www  e r    { }
    Subtype: Transistion 'tran'
        { Used for CGI compiled executables, not shell scripts. }
        DDT:
            Webmaster    r e w n    { }
            www   e    { }
    Subtype: File 'file'
        { }
        DDT:
            CGI      w r d n c    { }
            Webmaster   w r d n c    { }
    Subtype: Directory 'diry'
        { }
        DDT:
            CGI     w r    { }
            Webmaster   w r d n c    { }
            www            { }
    Subtype: Save 'save'
        { }
        DDT:
            CGI   c    { }
            Webmaster   w r d n c    { }
Domain: NetscapeAdmServ 'nas0'
    { This domain is for the Netscape Admin Server. }
    Privs:
        can_setlogin
    DIT:
        CGI   dt       { }
        NetscapeAdmServ   sJob sABRT   { To control itself. }
        www dt sJob       sHUP { }
    Subtype: Executable 'exec'
        { }
        DDT:
            NetscapeAdmServ   r e    { }
            Webmaster   r e    { }
    Subtype: Config 'conf
        { The Netscape Admin Server configuration file }
        DDT:
            Webmaster   r w n c d   { }
            NetscapeAdmServ   r w d n c   { }
    Subtype: File 'file'
        { Default file type. This is the type created whenever the Admin
          Server creates a file (Key/Certificate files, User Databases,
          temporary files, etc.). }
        DDT:
            Webmaster   w r d n c    { }
            NetscapeAdmServ   w r d n c   { }
            www r      { To read Key and Certificate files, and User
                         databases created by the Netscape admin
                         server. }
    Subtype: Directory 'diry'
        { }
        DDT:
            NetscapeAdmServ   w r d n c   { }
```

-continued

```
            Webmaster   w r d n c    { }
Domain: Webmaster 'Webr'
    { This domain is for web admin work. }
    Privs:
        is_admin
        has_rootness
    DIT:
        CGI          dt sJob                    { }
        NetscapeAdmServ   dt sJob      sABRT    { }
        Webmaster    sJob sHUP sABRT            { }
        www     dt sJob sHUP sABRT              { }
    Subtype: File 'file'
        { Default file type. }
        DDT:
            Webmaster   e w r d n c   { }
    Subtype: Executable 'exec'
        { }
        DDT:
            Webmaster   e    { }
    Subtype: Directory 'diry'
        { }
        DDT:
            Webmaster   w r d n c    { }
Domain: www 'www#'
    {The www domain is where any Web servers will be run, such as the
    Commerce Server. }
    Privs:
    DIT:
        CGI       dt               { }
        www sUser sJob sHUP sABRT   { Needs to
            control itself. }
    Subtype: Config 'conf'
        { The httpd configuration file(s). }
        DDT:
            NetscapeAdmServ   w r    { }
            Webmaster    r w n c d   { }
            www r        { }
    Subtype: File 'file'
        { Default file type. This is the type created whenever the
        Commerce Server creates a file (log files, temporary
        files, etc.). }
        DDT:
            NetscapeAdmServ   r n    { }
            Webmaster    w r d n c   { }
            www w r d n c   { }
    Subtype: Page 'page'
        { web pages }
        DDT:
            NetscapeAdmServ   r     { }
            Webmaster    r w n c d  { }
            www r        { }
    Subtype: Directory 'diry'
        { }
        DDT:
            CGI   r    { }
            NetscapeAdmServ   w r   { }
            Webmaster    w r d n c  { }
            www w r d c    { Web stores cached files in dirs,
                             needs to make and destroy as needed}
Domain: wwwCommon 'wwwc'
    { The common Web server domain (for items shared across burbs). }
    Privs:
    DIT:
    Subtype: Executable 'exec'
        { This is the Web Server executable type. }
        DDT:
            Webmaster   e     { }
            www e        { Need to be able to run the server. }
    Subtype: Config 'conf'
        { }
        DDT:
            NetscapeAdmServ   w r d n c    { }
            Webmaster    w r d n c         { }
            www r        { }
    Subtype: Directory 'diry'
        { }
        DDT:
            CGI   r     { }
            NetscapeAdmServ   w r    { }
            Webmaster    w r d n c   { }
            www r        { }
    Subtype: Page 'page'
        { }
        DDT:
            CGI   r     { }
            NetscapeAdmserv   r      { }
            Webmaster    w r d n c   { }
            www r        { }
```

Further information on an enhanced security commerce server can be found in "SECURE COMMERCE SERVER", U.S. patent application Ser. No. xx/xxxxx by Jensen et al., filed herewith, the details of which are hereby incorporated by reference.

Although the present invention has been described with reference to the preferred embodiments, those skilled in the art will recognize that changes may be made in form and detail without departing from the spirit and scope of the invention.

What is claimed is:

1. A method of achieving network separation within a computing system having a plurality of network interfaces, including a first and a second network interface, the method comprising:
   defining a plurality of burbs, wherein the plurality of burbs includes a first and a second burb and wherein the first burb includes a first protocol stack and the second burb includes a second protocol stack separate from the first protocol stack;
   assigning each of the plurality of network interfaces to one of the plurality of burbs, wherein assigning includes assigning the first network interface to the first burb and the second network interface to the second burb;
   binding processes to burbs; and
   restricting communication between processes bound to different burbs, wherein restricting communication between processes includes the steps of:
      examining a message received by the first network interface; and
      if the message is to be routed through the second network interface, routing the message up through the first protocol stack to a process bound to the first burb, transferring the message to a process bound to the second burb and routing the message down through the second protocol stack to the second network interface.

2. The method according to claim 1, wherein restricting communication between processes includes:
   preventing a process from accessing burbs other than the burb to which the process is bound;
   limiting transfer of incoming packets such that incoming packets can only go to processes bound to the burb associated with the network interface the packet arrived on;
   defining a proxy; and
   ensuring that data passing from the first network interface to the second network interface must pass through the proxy before moving from the first burb to the second burb.

3. The method according to claim 1, wherein each burb has its own routing table and wherein restricting communication includes examining an incoming packet to determine if its destination is an address in the burb's routing table.

4. The method according to claim 1, wherein restricting communication includes:
 defining a plurality of types;
 assigning each data object to one of the plurality of types, wherein assigning data objects includes defining type enforcement rules for accesses by processes to said data objects; and
 applying a type enforcement check of accesses by processes to data objects.

5. The method according to claim 2, wherein preventing a process from accessing burbs other than the burb to which the process is bound includes limiting each bound single user process to sending and receiving information from only one burb during the lifetime of that process.

6. A method of achieving network separation within a computing system having a plurality of network interfaces, including a first and a second network interface, the method comprising:
 defining a plurality of burbs, wherein the plurality of burbs includes a first and a second burb and wherein the first burb includes a first protocol stack and the second burb includes a second protocol stack separate from the first protocol stack;
 assigning each of the plurality of network interfaces to one of the plurality of burbs, wherein assigning includes assigning the first network interface to the first burb and the second network interface to the second burb;
 binding processes to burbs; and
 restricting communication between processes bound to different burbs, wherein restricting communication between processes includes:
  establishing an assured pipeline between the processes bound to different burbs;
  examining a message received by the first network interface; and
  if the message is to be routed through the second network interface, routing the message up through the first protocol stack to a process bound to the first burb, transferring the message through the assured pipeline to a process bound to the second burb and routing the message down through the second protocol stack to the second network interface.

7. The method according to claim 6, wherein establishing an assured pipeline between processes includes:
 defining a proxy; and
 ensuring that data passing from the first network interface to the second network interface must pass through the proxy before moving from the first burb to the second burb.

8. The method according to claim 6, wherein each burb has its own routing table and wherein restricting communication further includes examining an incoming packet to determine if its destination is an address in the burb's routing table.

9. The method according to claim 6, wherein establishing an assured pipeline between processes includes:
 defining a plurality of types;
 assigning each data object to one of the plurality of types, wherein assigning data objects includes defining type enforcement rules for accesses by processes to said data objects; and
 applying a type enforcement check of accesses by processes to data objects.

10. The method according to claim 6, wherein establishing an assured pipeline between processes includes limiting each bound single user process to sending and receiving information from only one burb during the lifetime of that process.

11. A secure server, comprising:
 an operating system kernel;
 a plurality of network interfaces which communicate with the operating system kernel; and
 a plurality of burbs, including a first and a second burb;
 wherein each network interface is assigned to one burb from the plurality of burbs, wherein each burb includes a separate protocol stack for handling communication across the network interface, wherein each protocol stack is associated with only one burb, wherein a first protocol stack is associated with the first burb, and wherein communication from a process bound to the first burb must pass through an assured pipeline between the first and second protocol stacks before being sent to the second burb.

12. The secure server according to claim 11, wherein each burb has its own routing table and wherein each burb further includes means for examining an incoming packet to determine if its destination is an address in the burb's routing table.

13. The secure server according to claim 11, wherein the operating system kernel includes type enforcing means for applying a type enforcement check of accesses by processes to data objects, wherein the type enforcing means includes type defining means for defining the modes and consequences of accesses by processes to data objects.

14. The secure server according to claim 11, wherein the operating system further includes a domain interaction table which enforces interactions between processes.

15. A computer-readable medium, comprising:
 program code for defining a plurality of burbs, wherein the plurality of burbs includes a first and a second burb, wherein the first burb includes a first protocol stack and the second burb includes a second protocol stack separate from the first protocol stack;
 program code for defining a plurality of network interfaces, including a first and a second network interface;
 program code for assigning each of the plurality of network interfaces to one of the plurality of burbs, including program code for assigning the first network interface to the first burb and program code for assigning the second network interface to the second burb;
 program code for binding processes to burbs; and
 program code for restricting communication between processes bound to different burbs, wherein the program code for restricting communication between processes includes program code for establishing an assured pipeline between the processes bound to different burbs, for examining a message received by the first network interface, for routing the message up through the first protocol stack to a process bound to the first burb, for transferring the message through the assured pipeline to a process bound to the second burb and for routing the message down through the second protocol stack to the second network interface.

16. The computer-readable medium according to claim 15, wherein the program code for establishing an assured pipeline between processes includes program code for defining a proxy and for ensuring that data passing from the first network interface to the second network interface must pass through the proxy before moving from the first burb to the second burb.

17. The computer-readable medium according to claim 16, wherein the program code establishing an assured pipeline between processes includes program code for limiting each bound single user process to sending and receiving information from only one burb during the lifetime of that process.

18. The computer-readable medium according to claim 15, wherein each burb has its own routing table and wherein the program code for restricting communication further includes program code for examining an incoming packet to determine if its destination is an address in the burb's routing table.

19. The computer-readable medium according to claim 15, wherein the program code for establishing an assured pipeline between processes includes program code for defining a plurality of types, for assigning data objects to types, for defining type enforcement rules for accesses by processes to said data objects and for applying a type enforcement check of accesses by processes to data objects.

20. A computer-readable medium, comprising:
  program code for defining a plurality of burbs, wherein the plurality of burbs includes a first and a second burb and wherein the first burb includes a first protocol stack and the second burb includes a second protocol stack separate from the first protocol stack;
  program code for defining a plurality of network interfaces, including a first and a second network interface;
  program code for assigning each of the plurality of network interfaces to one of the plurality of burbs, including program code for assigning the first network interface to the first burb and program code for assigning the second network interface to the second burb;
  program code for binding processes to burbs; and
  program code for restricting communication between processes bound to different burbs, wherein the program code for restricting communication between processes includes program code for examining a message received by the first network interface, for routing the message up through the first protocol stack to a process bound to the first burb, for transferring the message to a process bound to the second burb and for routing the message down through the second protocol stack to the second network interface.

21. The computer-readable medium according to claim 20, wherein the program code for restricting communication between processes includes:
  program code for preventing a process from accessing burbs other than the burb to which the process is bound;
  program code for limiting transfer of incoming packets such that incoming packets can only go to processes bound to the burb associated with the network interface the packet arrived on;
  program code for defining a proxy; and
  program code for ensuring that data passing from the first network interface to the second network interface must pass through the proxy before moving from the first burb to the second burb.

22. The computer-readable medium according to claim 21, wherein the program code for preventing a process from accessing burbs other than the burb to which the process is bound includes program code for limiting each bound single user process to sending and receiving information from only one burb during the lifetime of that process.

23. The computer-readable medium according to claim 20, wherein each burb has its own routing table and wherein the program code for restricting communication includes the step of examining an incoming packet to determine if its destination is an address in the burb's routing table.

24. The computer-readable medium according to claim 20, wherein the program code for restricting communication includes:
  program code for defining a plurality of types;
  program code for assigning each data object to one of the plurality of types;
  program code for defining type enforcement rules for accesses by processes to said data objects; and
  program code for applying a type enforcement check of accesses by processes to data objects.

* * * * *

UNITED STATES PATENT AND TRADEMARK OFFICE
CERTIFICATE OF CORRECTION

PATENT NO. : 6,219,707 B1
DATED : April 17, 2001
INVENTOR(S) : Gooderum et al.

It is certified that error appears in the above-identified patent and that said Letters Patent is hereby corrected as shown below:

Column 1,
Line 40, insert -- . -- between "con" and "What".

Column 2,
Line 4, delete "stacks:" and insert -- stacks; --, therefor.

Column 4,
Line 3, delete "seededwith" and insert -- seeded with --, therefor.

Column 5,
Line 34, delete "store" and insert -- stored --, therefor.
Line 56, delete "peqnits" and insert -- permits --, therefor.

Column 10,
Line 64, delete "burg" and insert -- burb --, therefor.

Column 13,
Line 23, delete "dentical" and insert -- identical --, therefor.

Column 14
Line 36, delete "configure-network" and insert -- configure network --, therefor.

Column 17,
Line 24, delete "<sys/socke.h>" and insert -- <sys/socket.h> --, therefor.

Column 24,
Line 36, delete "xx/xxxxx" and insert -- 08/594893 --, therefor.

Column 26,
Line 9, delete "addition. To" and insert -- addition, to --, therefor.
Line 10, delete "must e" and insert -- must be --, therefor.

UNITED STATES PATENT AND TRADEMARK OFFICE
CERTIFICATE OF CORRECTION

PATENT NO. : 6,219,707 B1
DATED : April 17, 2001
INVENTOR(S) : Gooderum et al.

It is certified that error appears in the above-identified patent and that said Letters Patent is hereby corrected as shown below:

Column 27,
Line 14, delete "administeation" and insert -- adminstration --, therefor.

Column 32,
Line 8, delete "Admserv" and insert -- AdmServ --, therefor.

Signed and Sealed this

Second Day of April, 2002

*Attest:*

*Attesting Officer*

JAMES E. ROGAN
*Director of the United States Patent and Trademark Office*